United States Patent
Sekido et al.

[11] Patent Number: 5,082,326
[45] Date of Patent: Jan. 21, 1992

[54] VEHICLE SEAT WITH AUTOMATIC ADJUSTMENT MECHANISMS UTILIZING INFLATABLE AIR BAGS

[75] Inventors: Hiroshi Sekido, Chiba; Tadashi Sakuma, Kanagawa; Toshimichi Hioki, Gifu, all of Japan

[73] Assignee: Okamoto Industries, Inc., Tokyo, Japan

[21] Appl. No.: 514,000

[22] Filed: Apr. 25, 1990

[30] Foreign Application Priority Data

| Apr. 28, 1989 | [JP] | Japan | 1-50325 |
| Apr. 28, 1989 | [JP] | Japan | 1-50326 |
| Apr. 28, 1989 | [JP] | Japan | 1-50327 |
| Apr. 28, 1989 | [JP] | Japan | 1-50328 |
| Apr. 28, 1989 | [JP] | Japan | 1-50329 |
| Apr. 28, 1989 | [JP] | Japan | 1-50330 |
| Apr. 28, 1989 | [JP] | Japan | 1-50331 |

[51] Int. Cl.$^5$ .............................................. A47C 3/00
[52] U.S. Cl. .................................. 297/284 R; 297/345; 297/430; 297/435; 297/408; 297/DIG. 3
[58] Field of Search ......... 297/284, 338, 460, DIG. 8, 297/DIG. 3, 408, 430, 434, 435, 431, 344, 396

[56] References Cited

U.S. PATENT DOCUMENTS

| 4,538,854 | 9/1985 | Wilson | 297/DIG. 3 |
| 4,629,248 | 12/1986 | Mawbey | 297/284 |
| 4,629,253 | 12/1986 | Williams | 297/DIG. 3 |
| 4,720,146 | 1/1988 | Mawbey et al. | 297/284 |
| 4,865,388 | 9/1989 | Nemoto | 297/DIG. 3 |
| 4,965,899 | 10/1990 | Sekido et al. | 297/284 |

FOREIGN PATENT DOCUMENTS

| 0068211 | 1/1983 | European Pat. Off. |
| 0097722 | 1/1984 | European Pat. Off. |
| 1458099 | 12/1976 | United Kingdom |
| 2168893 | 7/1986 | United Kingdom |

Primary Examiner—Kenneth J. Dorner
Assistant Examiner—Milton Nelson, Jr.
Attorney, Agent, or Firm—Darby & Darby

[57] ABSTRACT

An automatic vehicle seat capable of separately controlling the position or gradient of each portion of a vehicle seat using air bags. Automatic adjustment mechanisms utilizing inflatable air bags are included in the vehicle seat and are capable of adjusting and controlling the height of the seat level, the gradient of a headrest positioned on the seat back, the thigh support of the seat and the mobility of the seat body in a longitudinal direction.

13 Claims, 16 Drawing Sheets

VEHICLE SEAT WITH AUTOMATIC ADJUSTMENT MECHANISMS UTILIZING INFLATABLE AIR BAGS

BACKGROUND OF THE INVENTION

1. Field of the Invention

This invention relates to a vehicle seat in which the position and gradient of the seat can be automatically adjusted according to the preference of the seat occupant. More particularly, this invention relates to an improved vehicle seat equipped with an automatic adjustment mechanism capable of adjusting and controlling the height of the seat level, the gradient of a headrest positioned on the seat back, the thigh support of the seat and the mobility of the seat body in a longitudinal direction.

2. Description of the Prior Art

It is known in the art to provide vehicle seats having automatic mechanisms, such as an inflating mechanism for the contours of the seat, an elevating mechanism for the level of the seat and a mobilizing mechanism for the movement of the body of the seat in a longitudinal direction. Typically, these known mechanisms are driven by utilizing the stroke of a cylinder, such as a hydraulic cylinder, an air cylinder, or motordrive cylinder. The cylinders are controlled by a remote control on the dashboard. It is known that the inflating mechanism for the contours of the car seat can consist of an inflatable air bag. The bag is housed within the cushion of the seat contour and is actuated by a pneumatic means. However, the use of the air bag has been limited to the inflation of the contours and has not been used to replace the stroke of the cylinders, as described above.

It is known that the above conventional-type automatic vehicle seats are unpopular because of the high cost of production due to the use of expensive drive-sources. For example, the use of cylinders requires pumps and motors. In addition, the total weight of these mechanisms is not negligible. Thus, the mechanisms have the disadvantage of increasing the weight of the car, which is contrary to energy conservation. Further, the conventional mechanisms have the disadvantage that the car occupant sitting on the seat is uncomfortable when the seat is being adjusted because the cylinders are mechanically driven to thrust out their contour pads or to excessively change the position of the seat. Also, the seat position and seat contour are made of a metallic construction without any cushion on the mechanism. It is known that the conventional vehicle seats have the disadvantage that some of them are not equipped with an automatic system for automatically locking the seat body after the position of the seat body has been changed. Without automatically locking, the vehicle seat has the disadvantage that the seat can be moved by an external cause, such as the sudden stop of the car or a car crash and, thus, the vehicle seat has serious safety problems.

SUMMARY OF THE INVENTION

It is a general object of the present invention to provide an automatic vehicle seat capable of separately controlling the position or gradient of each portion of a vehicle seat by substituting air bags for air cylinders.

A more specific object of the present invention is to provide a reciprocation mechanism to automate the movement of each portion of a vehicle seat comprising a plurality of air bags multiply stacked between a bottom surface and an actuating plate, thereby transmitting the stroke of the air bags' reciprocation to the plate. The reciprocation mechanism is a substitute for the conventional type of air cylinder.

Another object of the present invention is to provide a vehicle seat having a seat back with an adjustable headrest, a seat portion with an elevating-type thigh support and a mobilizing mechanism to move the seat body in a longitudinal direction in which the headrest, thigh support and seat body are, respectively, driven by the air bags reciprocation.

A further object of the present invention is to provide an improved vehicle seat assembly equipped with an automatic mechanism capable of remotely controlling each portion of the vehicle seat. The improved vehicle seat assembly having a minimized product cost and being light-weight.

In accomplishing these objects, in one aspect of the present invention, the invention provides a seat back with a separate headrest positioned on top of the seat back. The upper half portion of the seat back can be made to bow slightly toward the front of the seat back. The upper half portion of the seat back and the lower half portion of the seat back are joined together by a first hinge positioned between the upper half portion and the lower half portion. The headrest portion is joined to the upper half portion of the seat back by a second hinge positioned between the top of the upper half portion and the bottom of the headrest in which the headrest portion can be made to bow slightly toward the front of the seat by means of the second hinge.

In the bowing mechanisms of these two portions, the bowing movements are performed by a dogleg-shaped lever. Specifically, levers are made of dogleg-shaped metallic plates having a width corresponding to the width of the seat back, which plates are joined coaxially with a hinge shaft. The upper portion of the lever plate is fixed to the rear side interior wall of the upper half portion of the seat back and the lower portion of the lever plate has a free end positioned in a box-shaped hollow space provided within the thickness of the lower half portion of the seat back. The upper half portion of the seat back can be moved to bow slightly when the free end of the lever plate is pressed toward the rear side interior wall of the hollow space by the plurality of air bags which are mutiply stacked between the free end of the lever plate and a front side interior wall of the hollow space. According to the inflating of the air bags, the free end of the lever is pressed toward the rear side of the hollow space and then the upper part of the lever is bowed toward the front of the seat in accordance with the doglegged angle. The aforementioned feature is the mechanism of bowing the upper half portion of the seat back.

Similar to the first hinge, the second hinge is joined coaxially with another dogleg-shaped lever plate in which the upper end portion of the second level plate is fixed within the headrest body and the free end of the second lever plate is positioned in a second box-shaped hollow space provided within the thickness of the upper half portion of the seat back. Air bags are disposed between the free end of the second lever plate and the bottom wall of the second hollow space which bags press against the free end of the second lever plate according to the inflating of the bags. Therefore, the headrest portion can be bowed, as well as the upper half portion of the seat back.

Referring now in detail to the aspect of the air bag system of the present invention which can be used as a substitute for the conventional hydraulic cylinder, the single body of the air bag consists of an almost square-shaped bag which is made of a plurality of thermal plastic sheets having a high tensile strength. The plurality of sheets can be laminated and the side peripheries of the sheets can be thermally welded together so as to seal the sheets to form air bags. The formed plurality of air bags are stacked by joining together with a thermal walding means the central portions of the air bags which face each other. Common opening passages are provided through the central portions of the air bags so as to communicate pneumatically with each other, thereby constituting a sort of bellow which can be a substitute for a cylinder when compressed air is supplied into the air bags.

In another aspect of the present invention, the invention provides an elevation seat having a plurality of air bags disposed between the bottom of the seat portion and a base of the seat portion. The bottom of the seat portion and the base thereof are linked by a pair of x-shaped cross members with a stopper device. The stopper device consists of a notch and a rack bar for supporting the seat portion securely in a level of elevation reached by the expansion and/or contraction of the air bags which are stacked longitudinally within the space between the x-shaped cross members. The air bags have a surface area which corresponds, as much as possible, with the interior surface area of the bottom of the seat portion. Thus, the air bags can easily lift up the whole seat body together with the occupant with minimized air pressure, such as about $0.1 \text{ kg/cm}^2$ (1,000 mm $H_2O/cm^2$). As the basis of this pressure, supposing that there is an air bag having the surface area of 929 $cm_2$ (one foot square) and the air pressure of $0.1 \text{ kg/cm}^2$ is supplied into the bag, the liftable load is 92.9 kg. Alternatively, if this load is lifted by using a conventional air cylinder having the inner diameter of 2.54 cm(1 inch), the necessary air pressure should be at 18.36 $\text{kg/cm}^2$ which may be beyond the normal air pressure used in the general industry. It can be understood, therefore, that the mechanism of the present invention facilitates the air compressor mechanism. For example, the present invention can employ even an oscillating-type air compressor having bellows made of a plastic material.

In a further aspect of the invention, a thigh support pad is provided at the front edge of the seat portion and the thigh support pad is adjusted automatically so as to move forward or backward by means of the expansion or contraction of the air bags, as a substitute for an air cylinder.

In a still further aspect of the invention, the invention provides a mobilizing seat body which can be moved forward or backward automatically in the longitudinal direction in response to a remote control signal activated from the dashboard by the occupant.

DETAILED DESCRIPTION

Figure 1:
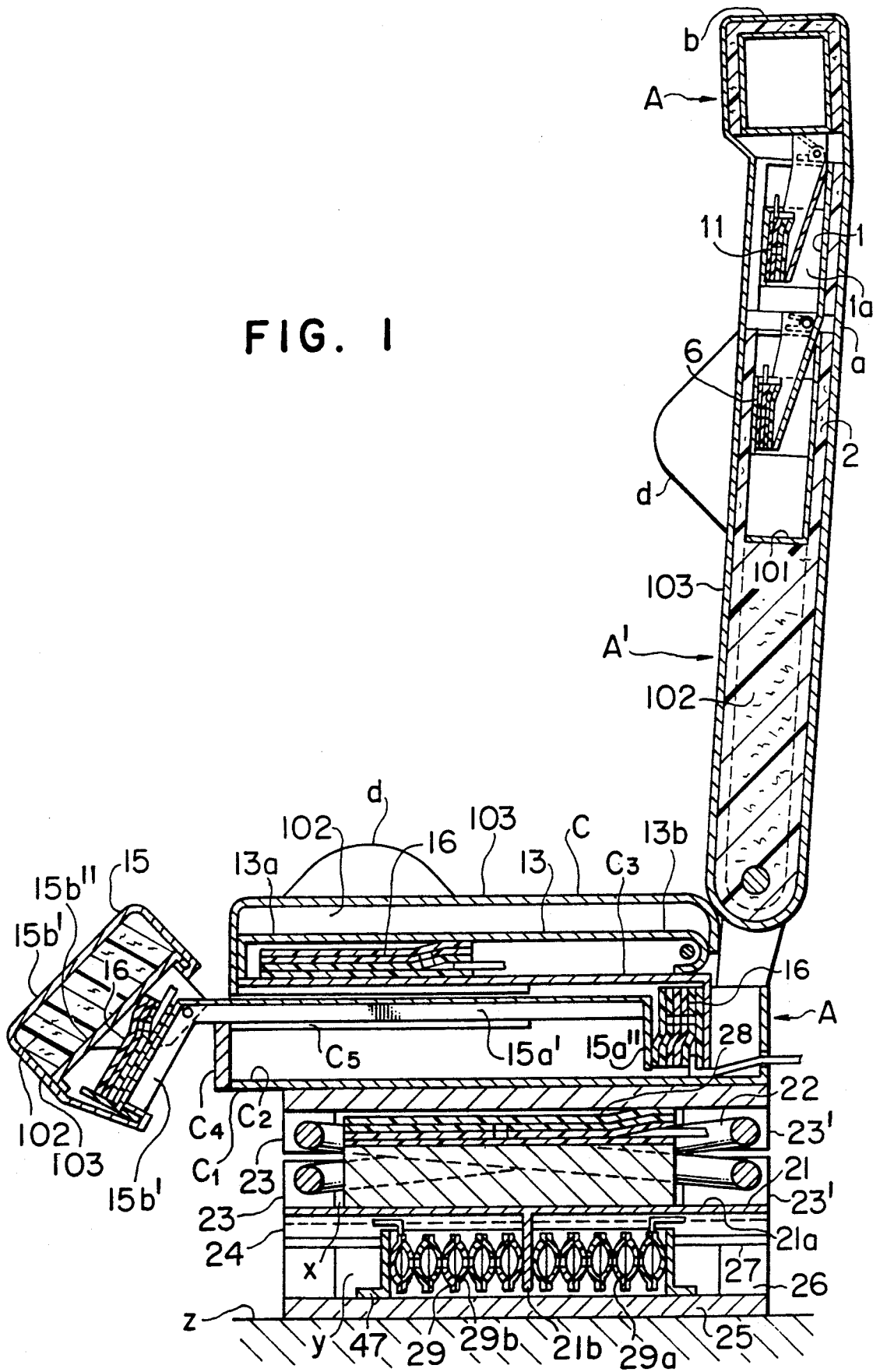
FIG. 1 is a side view of a vehicle seat of the present invention having several air bag systems.
Figure 3:
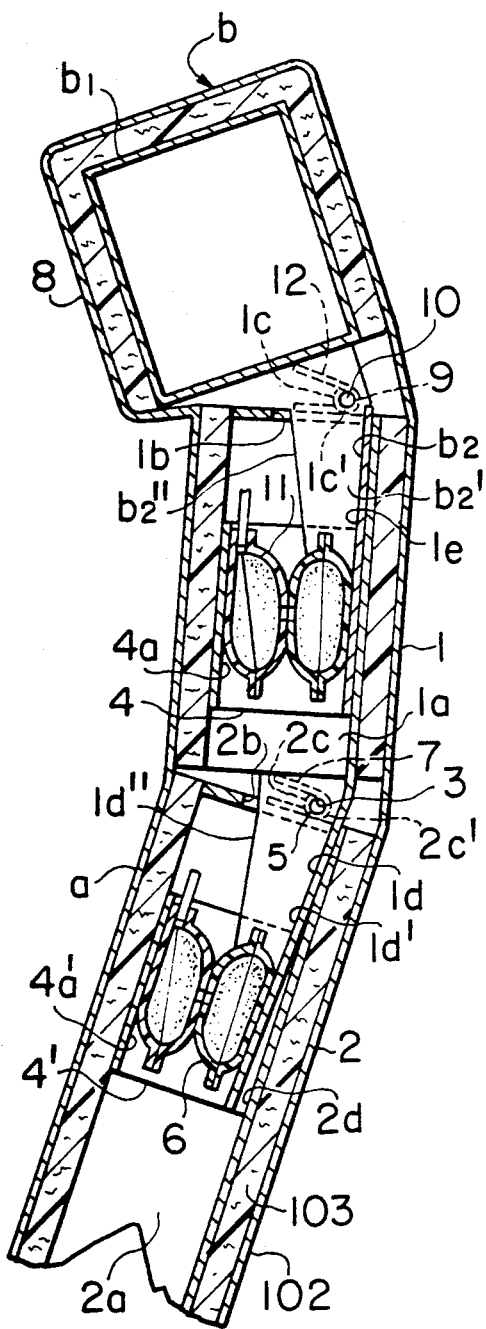
FIG. 3 is an enlarged side view of a portion of the seat back.

Referring to FIGS. 1 and 3, the seat back portion (a) of the present invention has a seat back body (1). A rear board (2) supports the seat back body (1). The seat back portion (a) has a head rest (b) positioned at the upper end of the seat back (a).

As shown in FIG. 3, an inner case (4) is formed in the upper portion of the seat back body (1). The inner case (4) forms a square shaped cavity having an opening in the top and bottom ends of the case. A dogleg shaped lever plate (b₂) has a straight portion of the plate positioned in the inner case (4) and a bend of the plate (b₂) extending through the opening in the top end case of the inner case (4). The bend of the plate (b₂) is connected to the bottom of the head rest body (b₁).

As shown in FIG. 1, the straight portion of the plate (b₂) contacts the air bags 11. When the air bags (11) are inflated, by feeding compressed air to the air bags (11), the bags press against the straight portion of the plate (b₂) to move the plate towards the rear wall of the case (4). The pressing of the plate (b₂) towards the rear wall moves the bend of the plate in a forward direction which, in turn, moves the head-rest at an inclined angle towards the occupant of the seat. The inclination facilitates the positioning of the occupant's head during driving.

Figure 7:
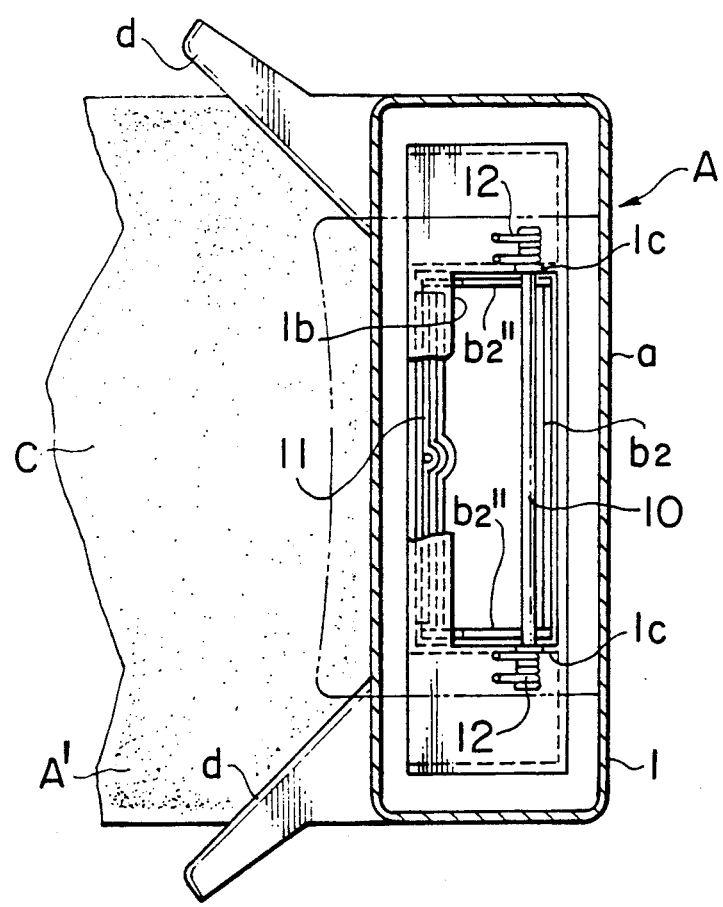
FIG. 7 is a transverse top plan view of the seat back portion.

A downward half plate (b₂') is connected to the bottom of the head rest body (b₁). Side walls (b₂'') are perpendicularly connected to the downward half plate (b₂') and extend within the inner case (4) toward the straight portion of the lever plate (b₂). A hinge shaft hole (9) is provided in each of the side walls (b₂''). As shown in FIG. 7, a hinge shaft (10) is positioned through each of the shaft holes (9). A pair of C-shaped springs (12) are provided having an inward bias and having one end connected to either end of the hinge shaft (10). The other end of the spring (12) is attached to the bottom of the head rest body (b₁) so as to pull the head-rest body (b₁) downward. Thus, the springs (12) hold the head rest (b₁) in an upright position unless the air bags (11) are actuated.

In FIG. 3, a box-shaped hollow space (2a) is provided within the thickness of the lower half portion of the seat back body (1) and an inner case (4') is housed in the hollow space (2a). The inner case (4') forms a square shaped cavity having an opening in the top and bottom ends. A dogleg shaped lever plate (1d) has a straight portion (1d') attached to a bend (1e). The straight portion of the plate (1d') is positioned in the inner case (4') and the bend (1e) extends through the opening in the top end of the upper portion into a hollow space (1a). The bend (1e) is connected with screws (not shown) to the interior rear wall (2d) of the hollow space (1a). The length of the lever plate (1d) extends along the length of the entire upper portion of the seat back body (1). The straight portion (1d') can move freely in the inner case (4'). The side walls (1d'') are connected to the top wall of the inner case (4') and slope toward the free end of the straight portion (1d') in order to reinforce the lever plate (1d).

As shown in FIG. 3, a pair of hinge shaft holes (3) are provided in a corner portion of the side walls (1d''') for receiving a hinge shaft (5). A pair of hinge shaft brackets (2c) having hinge shaft holes (2c') are connected to the walls of the hollow space (2a). The hinge shaft brackets (2c') are connected to a downward half plate (1d') of the dogleg shaped lever plate which plate is inserted within the brackets (2c). A shaft (5) is threaded through the hinge shaft holes (2c') and the hinge shaft holes (3).

Air bags (6) are positioned between the downward half plate (1d') of the dogleg shaped lever plate (1d) and the front side interior wall (4a') of the inner case (4'). When the air bags (6) are inflated, by feeding compressed air to the air bags (6), the bags press the straight portion of the plate and move the plate towards the rear wall of the case (4'), whereby the upper half portion of the seat back body (1) is moved toward the front of the seat back. In summary of the aforementioned aspects, the seat back body (1) of the present invention comprises two parts; a head rest portion (b) and an upper half portion. The two parts can change their gradients respectively according to the occupant's preference. The air bag system is adopted to substitute for the conventional hydraulic cylinder.

In FIG. 3, a pair of C-shaped springs (7) having an inward bias are provided between the bottom of the upper half portion of seat body (1) and the top portion of the opening (2b). One free end of the spring (7) is engaged with the bottom of the upper half portion and the other end of the spring is connected to the top portion of opening (2b), respectively, so as to pull downward the upper half portion of the seat back (1) for retaining the seat back body in an upright position unless the air bags (6) are actuated. The seat back portion (a), is positioned at the rear end of the seat portion (C) of the vehicle seat so as to recline or rise freely by utilizing a locking mechanism, as is known in the art.

In a modification of the described headrest portion and the upper half portion of the seat back (1), the adjustable gradient angle or the inclining angle relates to the stroke distance of the downward half plate (b₂') of the lever plate (b₂) reciprocating between both interior walls of the inner case (4) according to the expansion and contraction of the air bag system, which can be modified by adjusting the size of the inner case into which the dogleg plates extend. In one modification, the thickness of the seat back body can be changed to change the size of the inner case.

In another modification, the size of the inner case can be enlarged without increasing the thickness of the seat back body.

In another modification, the walls (4a'),(4a), which are positioned opposite of the air bags for expanded air bags contacting, can be replaced with an independent plate supported by an adequate number of arms which extend from the rear side wall of the respective case (4'),(4).

Figure 2:
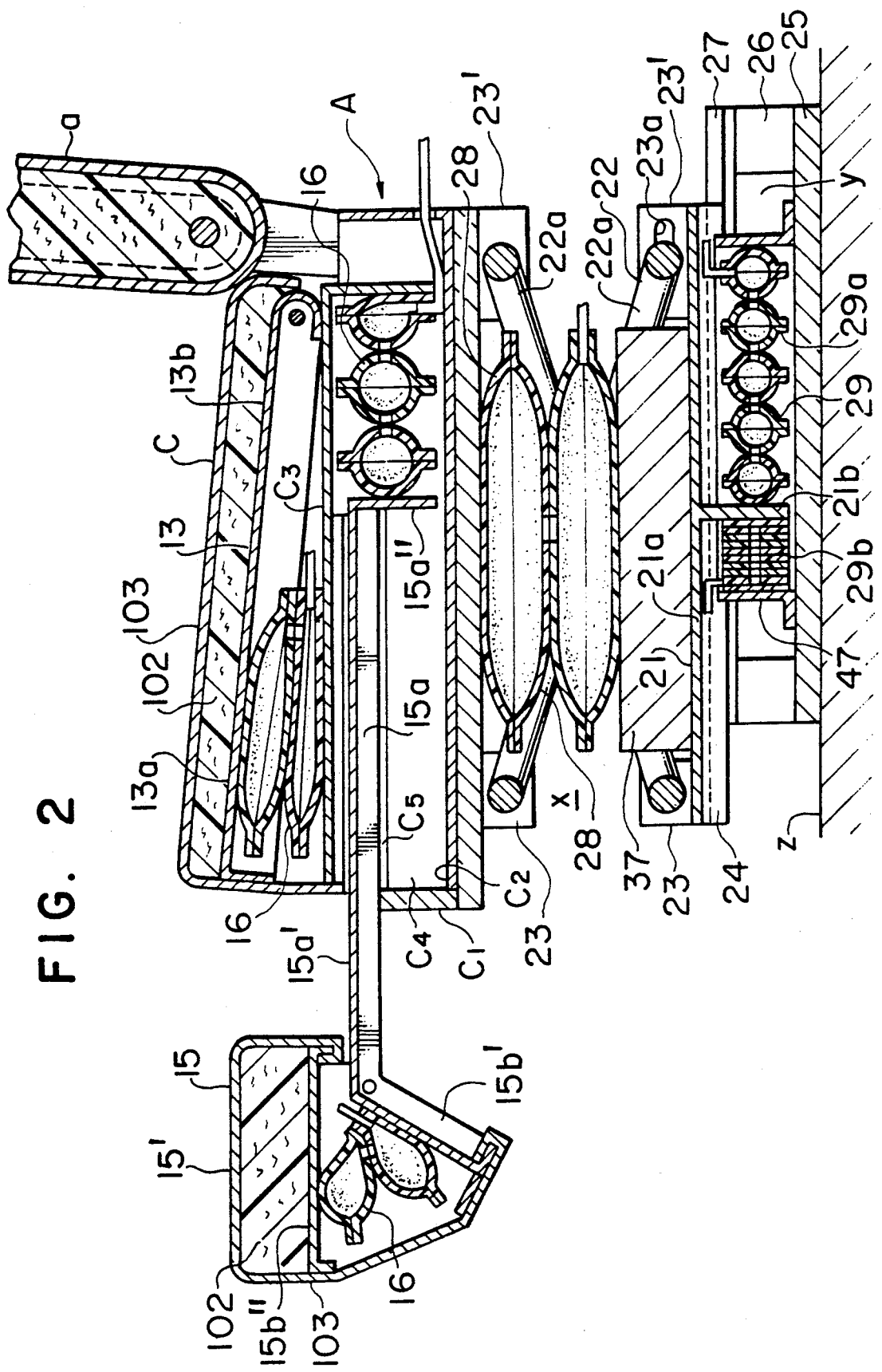
FIG. 2 is an enlarged side view of a portion of the seat showing the inflated air bags of the present invention.

Referring now in detail to the seat portion (C) of the present invention, in FIG. 2 the seat portion (C) consists of four components: an inclining mechanism for changing the gradient of seat portion (C); a thigh support mechanism for reciprocating the thigh support portion (15) at the front edge of seat portion (C) and changing the gradient of the thigh support portion (15); a lift mechanism for elevating the seat portion (C); and a mobilizing mechanism for moving the seat portion in the longitudinal direction along a car floor. The present invention uses an air bag system as the drive source for the above-described components as a substitute for a conventional hydraulic cylinder, it being noted that the air bag system is utilized in various portions of the seat.

In FIG. 2, the seat portion (C) consists of a trim cover (103) surrounding a cushion material (102) which forms a contour of the seat portion (C). A support plate (13) supports the cushion material (102). A pair of pivotal frames (13a), (13b) are fixed to the bottom of the support plate (13) in either end of the plate (13). The rearwardly positioned end of the frames (13a,)(13b) are pivoted to constitute hinges which pivot with a hinge bracket (not shown in the drawings). The frames (13a),(13b) are fixed to cover case (C₃). Air bags (16) are disposed between frame (13a) of the support plate (13) and the surface of the cover case (C₃) for lifting the support plate 13. The lifting of the plate (13) gives a minor change of seat gradient upon the seat portion (C), according to the expansion and contraction of the air bags (16).

Figure 8:
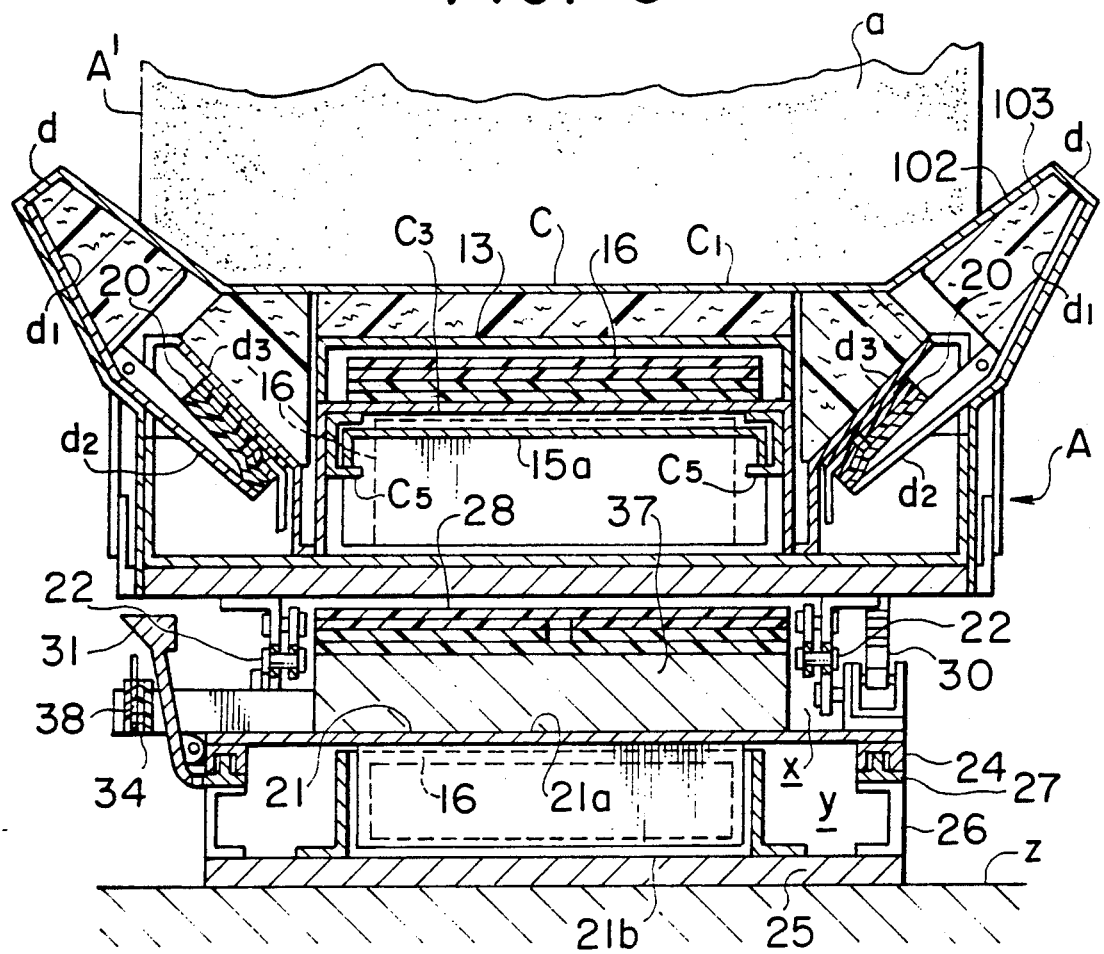
FIG. 8 is a vertical front view of the lower portion of the seat.

Referring to the thigh support component, in FIGS. 2 and 8, this component consists of a unit body (15') of the thigh support portion (15) and a trim cover sheet (103), which surrounds the cushion (102). The cushion (102) is supported by a support plate (15b''). Air bags

(16) for adjusting the gradient of the thigh support body (15) are positioned below the support plate (15b"). A pair of frames (15a) of the thigh support portion (15) have a free end bend (15b'), an upper plate portion (15a') and a stroke receiving plate (15a"). The receiving plate (15a") is supported vertically of the frame (15a). The cover case (C₃) is fixed on the bottom plate (C₂), which bottom plate (C₂) is arranged on the main frames (C₁), thereby housing the aforementioned mechanisms of the thigh support portion (15) and its back-up mechanisms. The frames (15a) slidably move on a pair of grooved rails (C₅) having a concave-shaped section. A front edge cover (C₄) covers the front opening portion of the cover case (C₃). In addition, although this is not shown in the drawings, coil springs are stretched between the support plate (15b") of the thigh support portion (15) and the bend (15b') of the frames (15a), and further between the stroke receiving plate (15a") of the frames (15a) and the rear wall of the cover case (C₃). These coil springs should be housed in the respective mechanisms.

Figure 6:
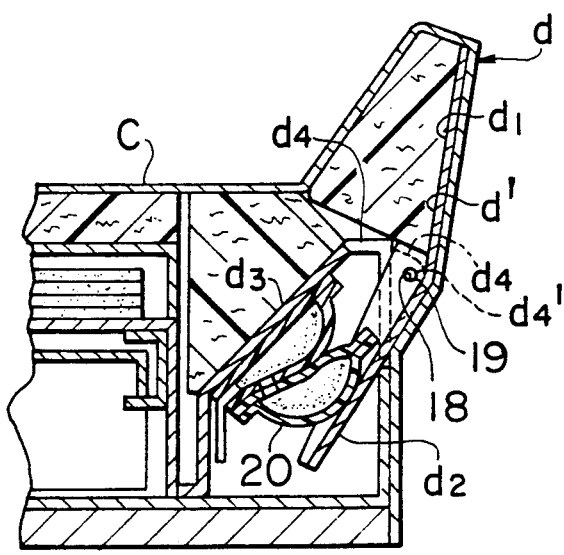
FIG. 6 is a transverse sectional view of the side supports provided in the sides of the seat portion.

In FIGS. 6 and 8, an attachment for the comfort of the occupant by backing up the seat portion and the seat back portion comprises side support pads (d) which are provided to hold the sides of the occupant's thigh portions in the seat and also to hold the occupant's sides in the seat back during the driving of the car. FIG. 8 shows the symmetry of a mechanism of a pair of side supports (d) which are positioned on both sides of the seat portion (C). In FIG. 6, the side support pads (d) match the contour of the seat portion. A hollow space is provided under the side support pads (d) to house air bags (20) which are arranged in combination with a dogleg-shaped lever plate (d₂). A pair of sloped walls are bent vertically at both sides of the lever plate (d₂). An outer board (d') has a trim cover sheet. An upper half portion (d₁) of the dog-legged lever plate (d₂) is fixed to the outer board (d'). The plate (d₂) and the fixed outer board (d') are raised together with the pads (d) when the air bags (20) are expanded between the wall (d₃) of the hollow space and the upper half portion (d₁) of the lever plate (d₂). The air bags (20) press the downward half portion (d₂) of the dogleg-shaped lever plate (d₂) outwardly. A pair of hinge shaft holes (18) are provided at the doglegged corner portion of the sloped walls of the lever plate (d₂) to engage with a pair of hinge brackets (d₄), respectively, which brackets are fixed on the outer vertical wall of the hollow space by passing a hinge shaft (19) into the shaft holes.

Figure 4:
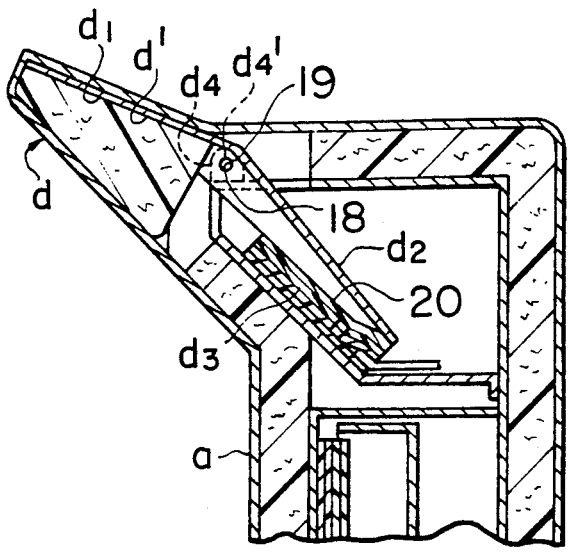
FIG. 4 is a transverse sectional view of the side support provided on the sides of the seat back portion.
Figure 5:
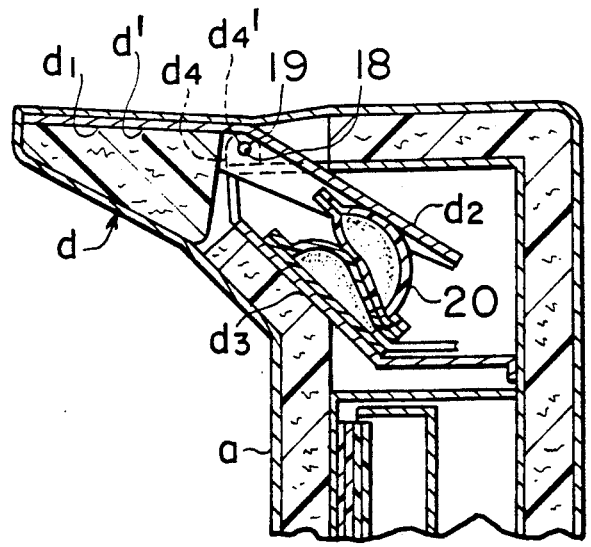
FIG. 5 is a transverse sectional view of the side support provided on the sides of the seat back portion with expanded air bags.

In FIGS. 4 and 5, the other side support pads (d) for the seat back (a) are shown with the same compositions and functions from FIG. 6 so that a detailed explanation will be omitted. In addition, these side support pads (d) are constantly pulled in an outward direction so as to be opened toward the upper direction by stretching a pair of pulling biased springs (not shown in the drawings) between the walls (d₃) and a plate (d₂), thereby inclining each side support outwardly.

Figure 26:
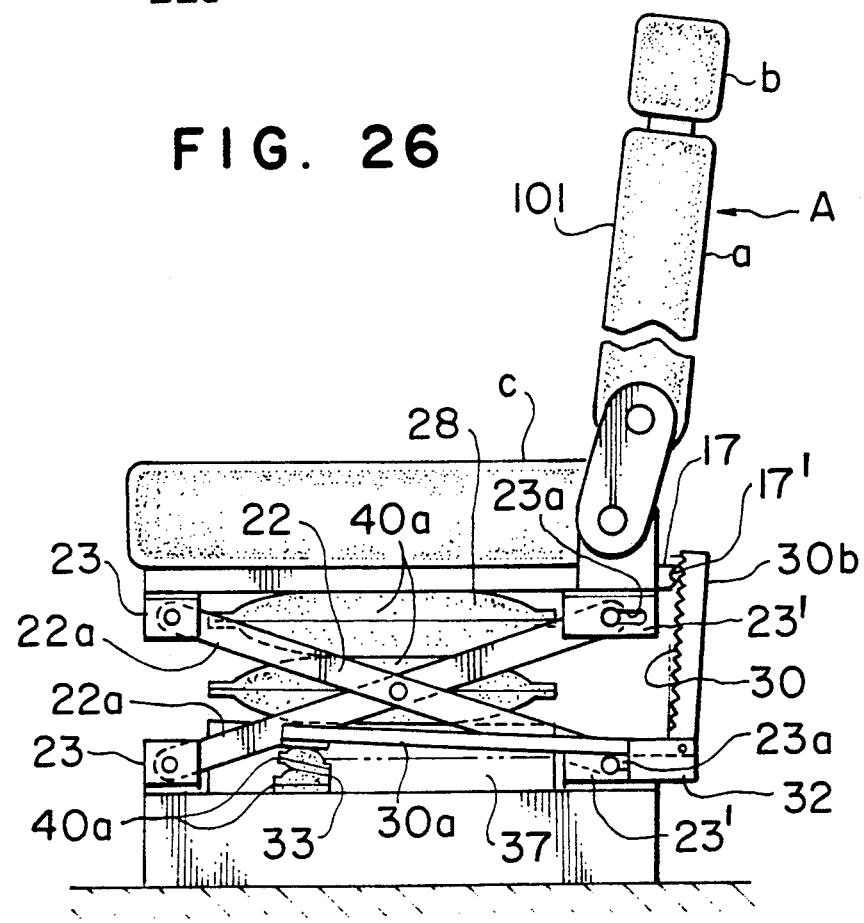
FIG. 26 is a side view for showing the same seat body of FIG. 25 when the seat is elevated.

Now we shall describe an elevation system of the seat body (a) equipped with an automatic lifting mechanism for utilizing an air bag system as a substitute for the conventional hydraulic cylinder and the like. In FIGS. 1 and 26, this elevation system of vehicle seat (a) comprises an intermediate plate (21) provided to support the seat body (a) through a pair of x-shaped link mechanisms (22) with the air bag system. The pair of x-shaped link mechanisms (22) consist of four pieces of bar members (22a) with each pair crossing each other and mounted pivotally at a center position. A pivotal hole is provided at each free end of the bar members (22a). A pair of brackets (23) having pivotal holes are fixed commonly on the front end of the intermediate plate (21) and the front end of the bottom surface of the main frame (24). Another pair of brackets (23') have lateral slits (23a) positioned on the rear end of the intermediate plate (21) and the rear end of the bottom surface of the main frame (24). Each free end of the x-shaped bar members (22a) is pivoted with these brackets (23), in order to constitute a link mechanism to keep the level of the seat body (a) constant, according to the elevating movement of seat body (a) by means of the expansion and contraction of the air bag system (28) which is assembled between both link mechanisms. In the link motion of the x-shaped link mechanism, the idle slits (23a) of the brackets (23') allow the pivoted portion of the free end of the bar member (22a) to slide along within the slits (23a) according to the rising movement of the x-shaped link mechanism by the expansion of the air bags (28) and to the other ends of the bar members (22a) being pivotally fixed with the brackets (23).

Figure 12:
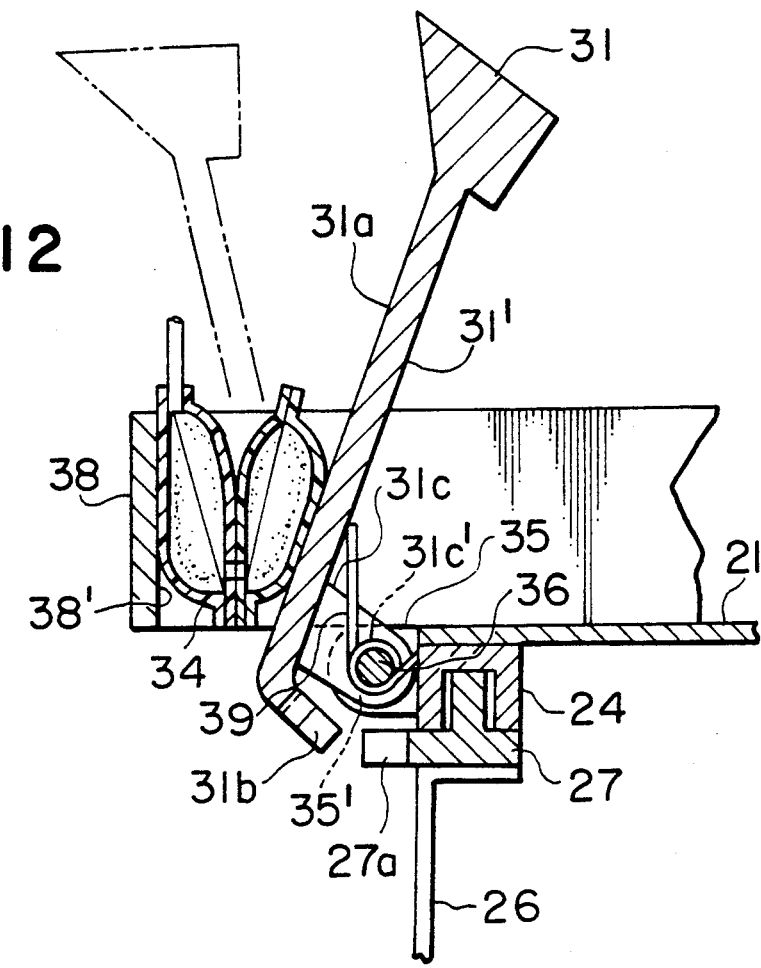
FIG. 12 is a vertical front view of a rail for moving the seat body.

Referring now to a mobilizing mechanism of the seat body (a) including an elevation system, in FIGS. 1 and 12, the elevation mechanism is formed of the main frames (24) which support the intermediate base (21). The mobilizing mechanism consists of four components. The first component is the main frames (24) having a concave-shaped cross section to engage with and slide on a rail by means of the reciprocation of air bags (29). The second component is convex-shaped rails (27) combined with a rack rail (27a) (FIGS. 12 and 13) which receive the concave-shaped main frames (24) by the convex rail portions and which rails have a suitable length corresponding to a span capable for moving the seat body (a) a predetermined distance. A gear of the rack rail (27a) engages with a lock pin as a locking device, which device is actuated automatically by the air bags (34) and is synchronized with the movement of the seat body (a). The third and fourth components are a group of air bags (29a),(29b), respectively, which are disposed in a space (y) and are separated by a partition plate provided between them (as shown in FIG. 1).

Figure 13:
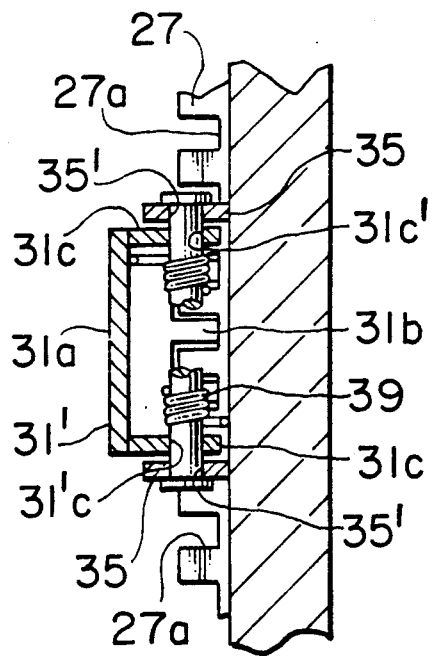
FIG. 13 is a transverse top plan view of a locking position engaged with a rack.

In FIG. 12, the locking device includes an engaging lever plate (31') formed as a L-shaped lever plate and laterally bent lock pins (31b). As shown in FIG. 13, the lock pins (31b) are formed in the locking device for engaging with the rack gears (27a) of the rack rail (27). A pair of pivotal brackets (31c) extend from both side edges of the lever plate at the lower portion of the lever plate (31'). The pivotal brackets (31c) are engaged with the pivotal brackets (35) which are fixed to the concave-shaped main frames (24). The plurality of lock pins (31b) are connected between the opposed pivotal brackets (35) by passing a shaft (36) through each hinge hole (31c') of the brackets. The engaging lever plate (31') is arranged in parallel with a vertical wall (38). The wall (38) projects from the side surface of the support base (37) so as to cross at a right angle against the rack rail (27a). Air bags (34) are disposed in a space provided between the receiving surface (38') of the vertical wall (38) and the receiving surface (31a) of the lever plate (31'). A pair of coil springs (39) are arranged around the shaft (36) for biasing the engaging lever plate (31') toward the receiving surface (38') of the vertical wall (38), unless the air bag system (34) is expanded.

The pair of convex-shaped rails (27), combined with the rack rail (27a), are further attached to a pair of rail bases (26). The rail bases (26) are supported on a pair of bottom bases (25) supported on the car floor (z).

Another locking mechanism can be used exclusively for locking the seat level after the seat level is elevated by the elevation mechanism. The elevation of the seat also requires a locking device to stop the elevation of the seat at a preferable position during the operation of the elevation mechanism. This feature is indispensable in order to stop the seat mobility for car driving security.

Figure 9:
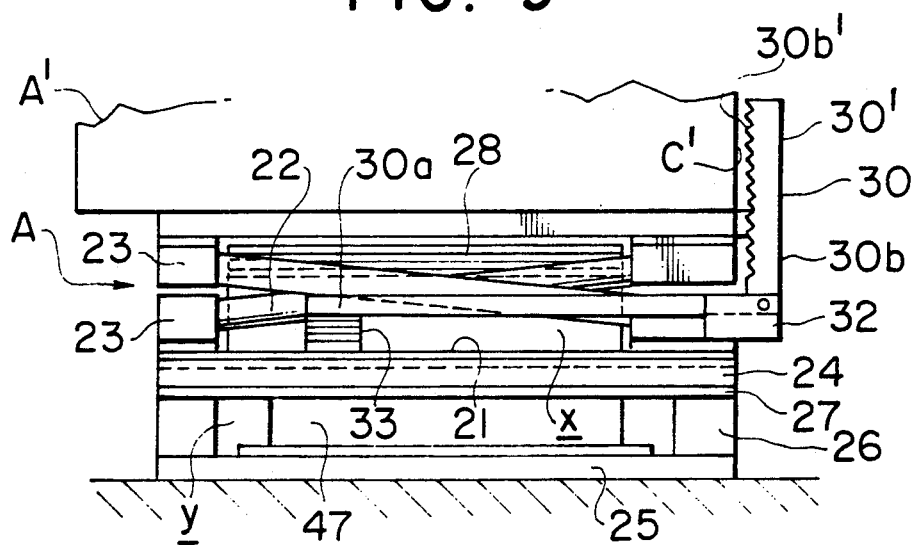
FIG. 9 is a side view of the elevation mechanism provided between a seat portion and a base of the seat.
Figure 10:
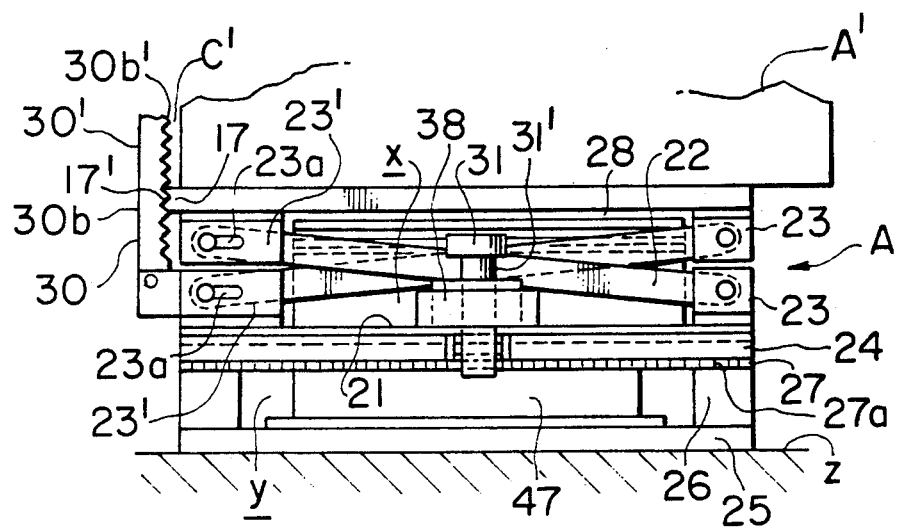
FIG. 10 is a side view of a locking portion.
Figure 11:
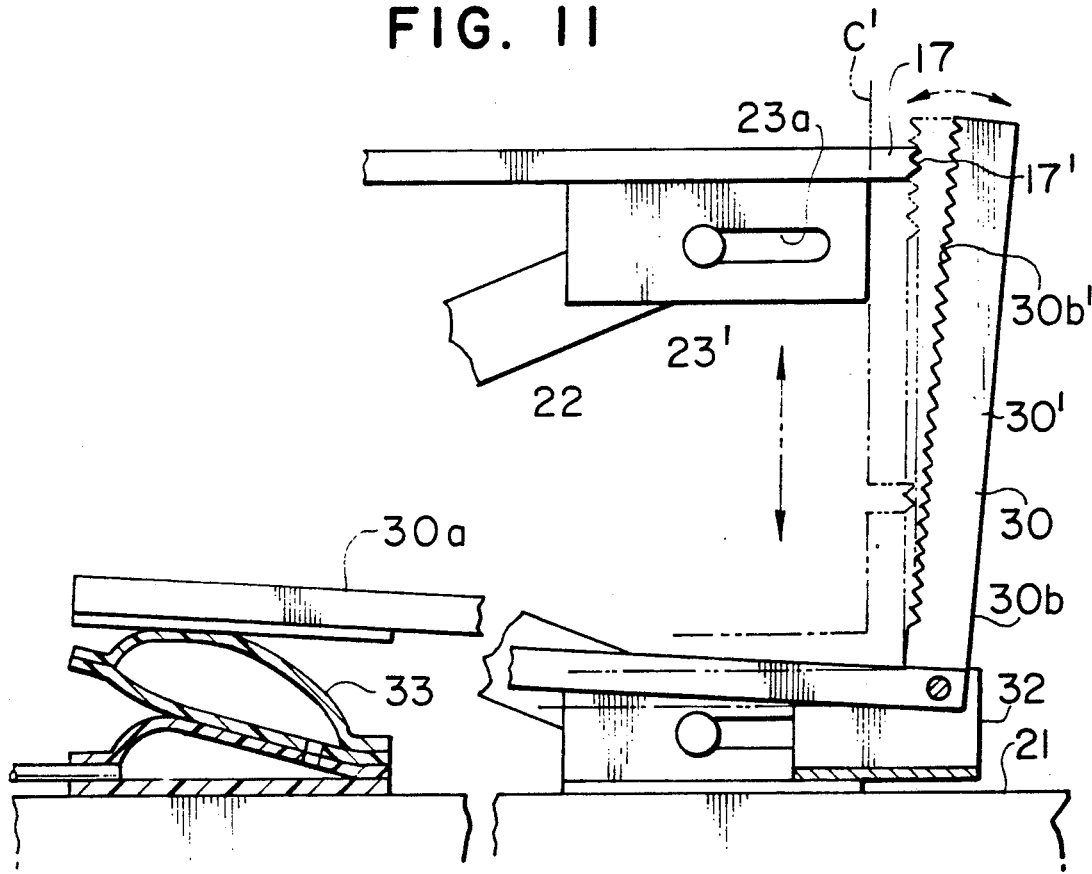
FIG. 11 is a side view of the locking portion with an actuator and air bags forming an elevation mechanism.
Figure 27:
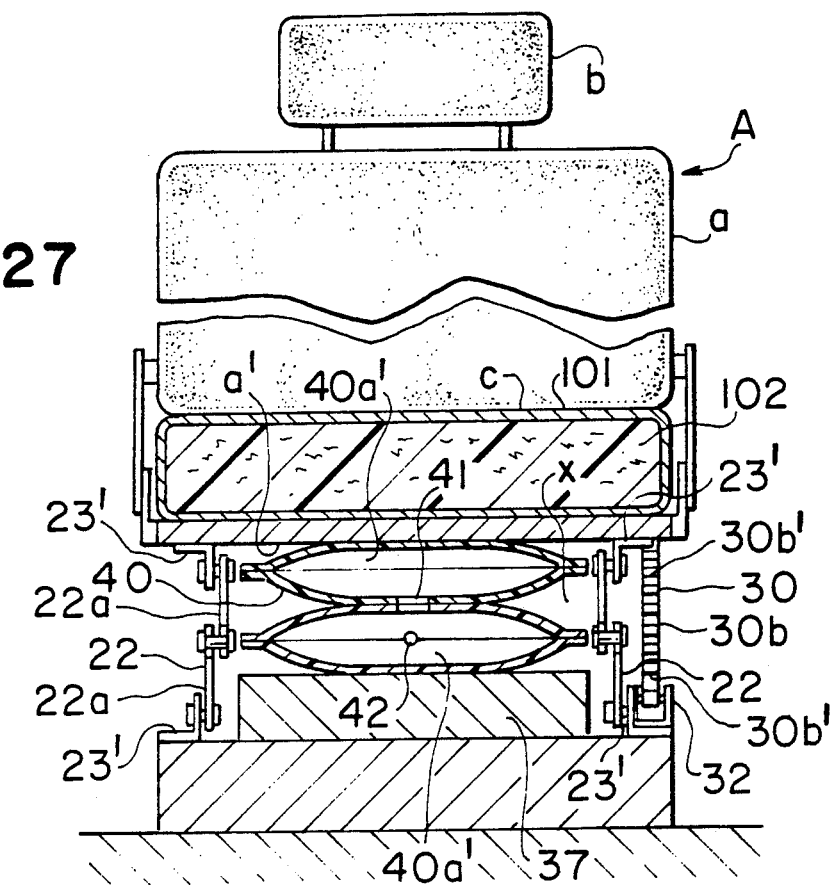
FIG. 27 is a vertical front view for showing the seat body of FIG. 26.

In FIGS. 9, 10 and 11, there is shown the seat level locking mechanism comprising a L-shaped lever (30) consisting of a vertical frame (30b) with rack gears (30b') and a horizontal frame portion (30a). The bottom surface of the frame (30a) contacts the air bags (33) and the expansion and contraction of the air bags (33) forms the seat level locking mechanism. The vertical frame (30b) is required to have a sufficient length, including the rack gears (30b'), to be capable of engaging with a lock pin (17). The lock pin (17) projects from the rear end of the seat base frame. In FIGS. 27 and 11, the right angle corner portion of the L-shaped lever (30) is pivoted rotatably in a U-shaped bracket (32) to move the plate toward the rear end edge of the intermediate base (21) of the seat body (a). According to the expansion and contraction of the air bags (33), disposed under the bottom surface of the horizontal frame (30a), the vertical frame (30b) performs a metronomic movement for disengaging and engaging the rack gears (30b') with the lock pin (17), wherein the seat elevation can be stopped at a preferable position.

Figure 19:
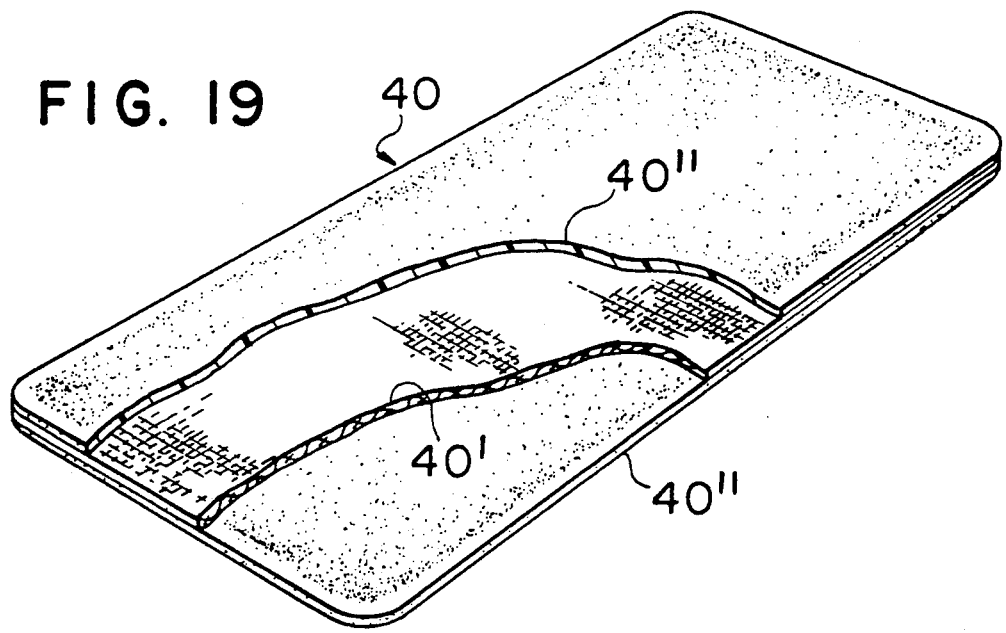
FIG. 19 is a schematic illustration of an air bag formed of laminated sheets.
Figure 20:
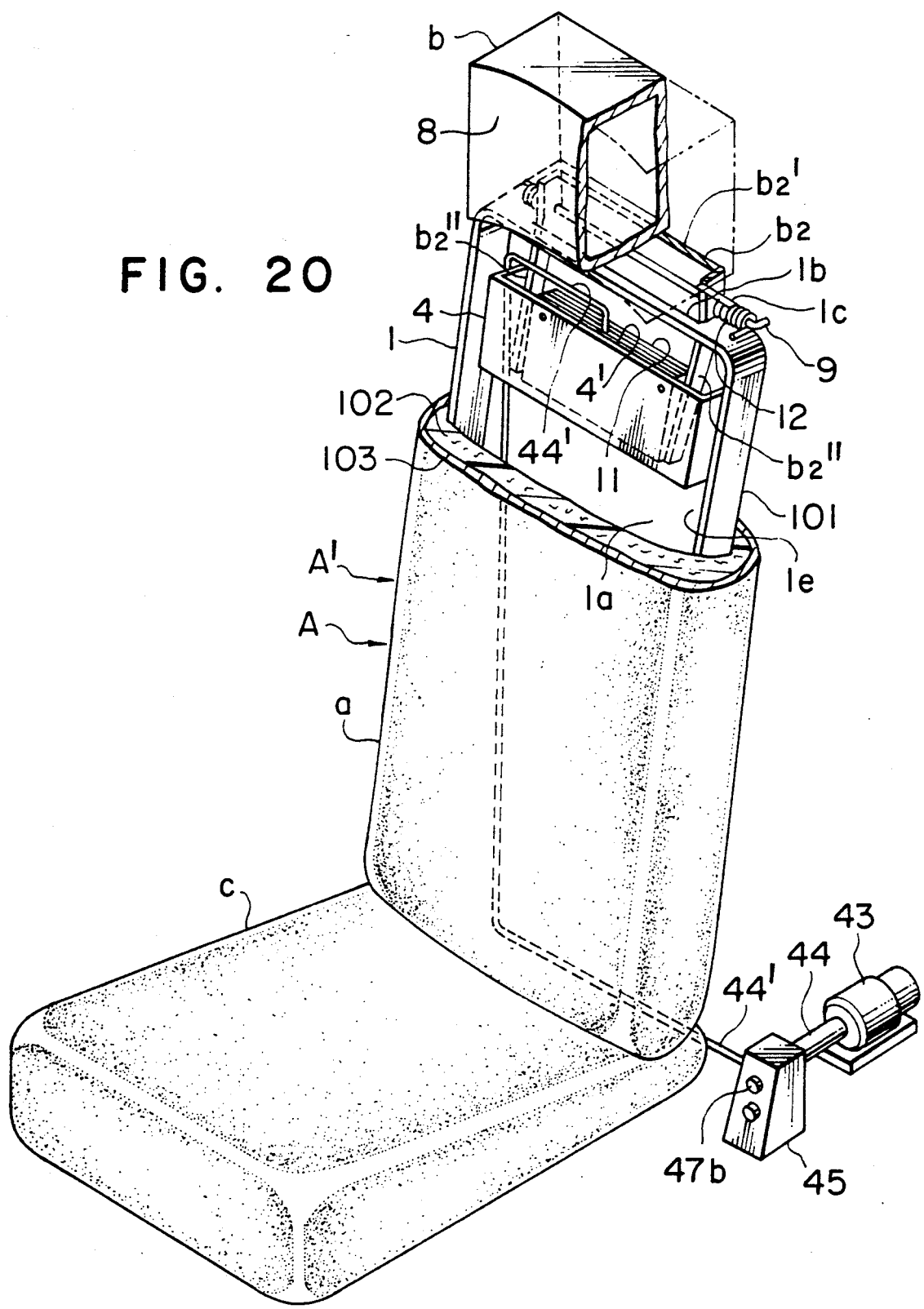
FIG. 20 is a perspective view of the vehicle seat of the present invention.
Figure 21:
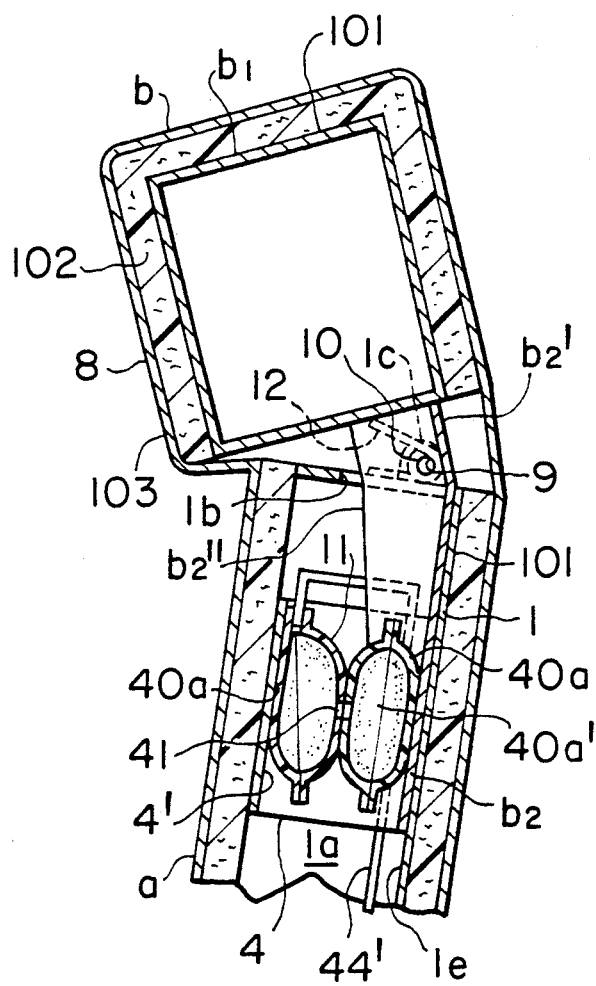
FIG. 21 is an enlarged sectional view of a headrest portion according to the present invention.
Figure 22:
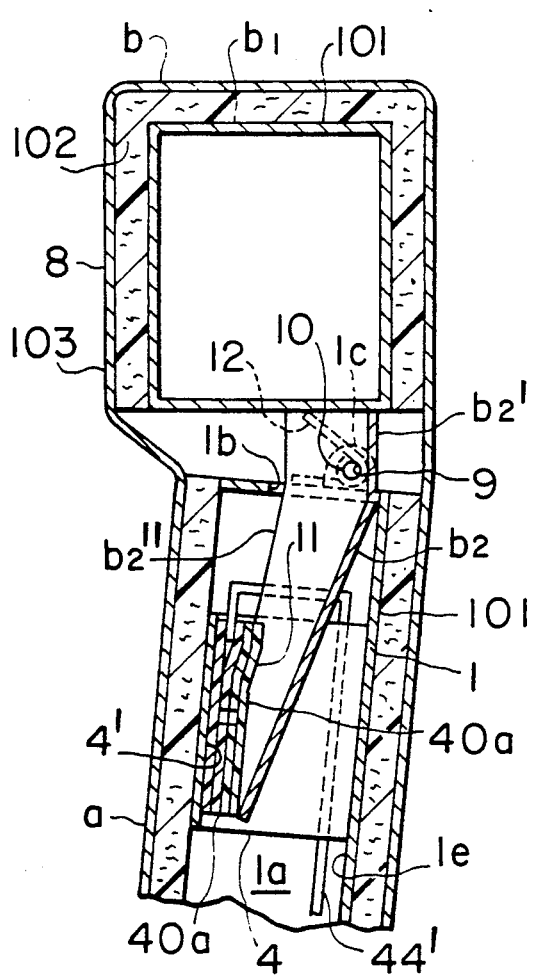
FIG. 22 is an enlarged sectional view of a headrest portion according to the present invention.

In FIGS. 15-19, there are depicted the air bags to be used in this invention. FIG. 19 shows the essential composition of the sheet material (40) of the air bag (40a). The sheet material (40) is a laminated sheet consisting of three layers. More particularly, a net-shaped core material (40') is sandwiched between two sheets (40"), as shown in FIG. 19. With respect to the net-shaped core material, it is a woven fiber and/or a filament having non-expandable properties and a high tensile strength. It can be made of a synthetic resin such as a polyester resin, a polyamide resin. The diameter of the fiber or filament is between 50 and 100 microns and the woven meshes are between 70 and 200 meshes per inch. This core material (40') is sandwiched between two sheets made of, for example, a polyurethane resin having slightly harder properties for a thermal plastic workability. Thus, they are laminated as a single sheet (40), by means of a process which is well-known in the art.

Figure 16:
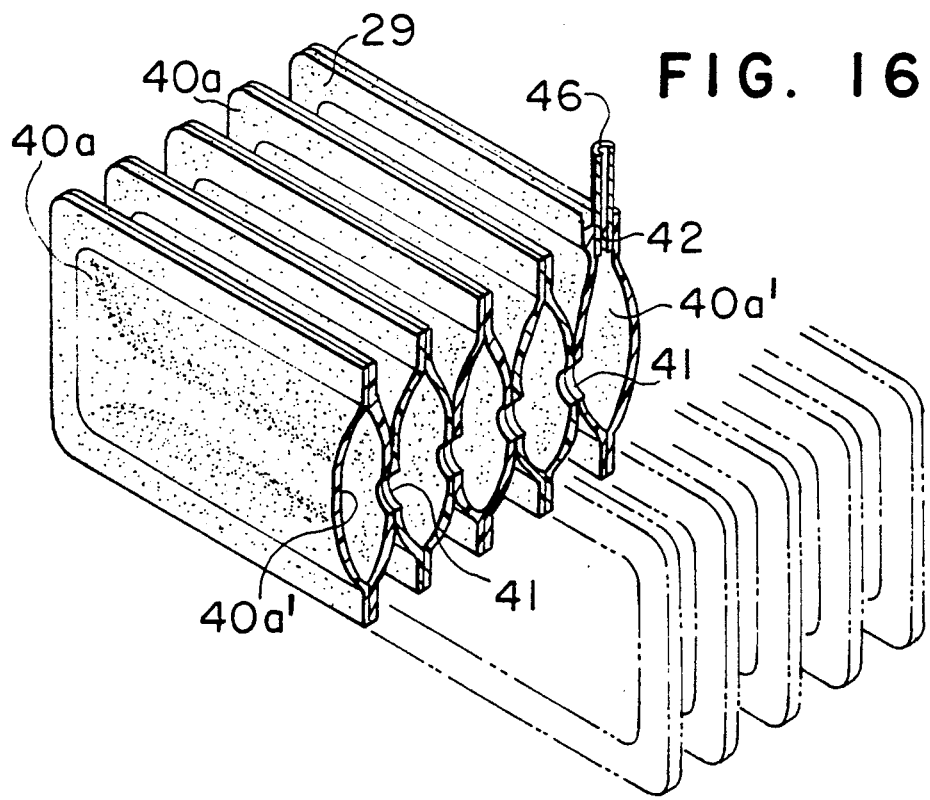
FIG. 16 is a perspective illustration.
Figure 17:
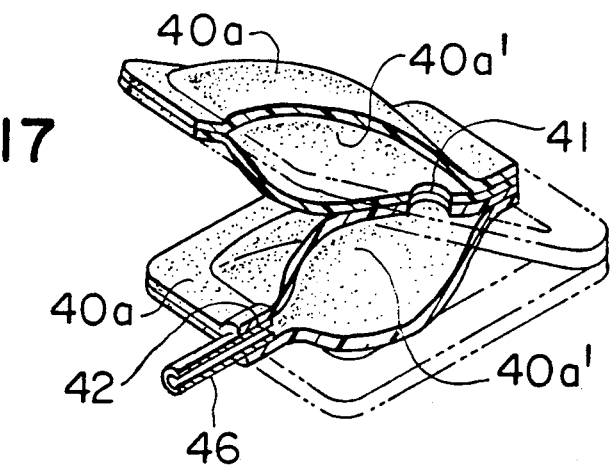
FIG. 17 is a perspective illustration.
Figure 18:
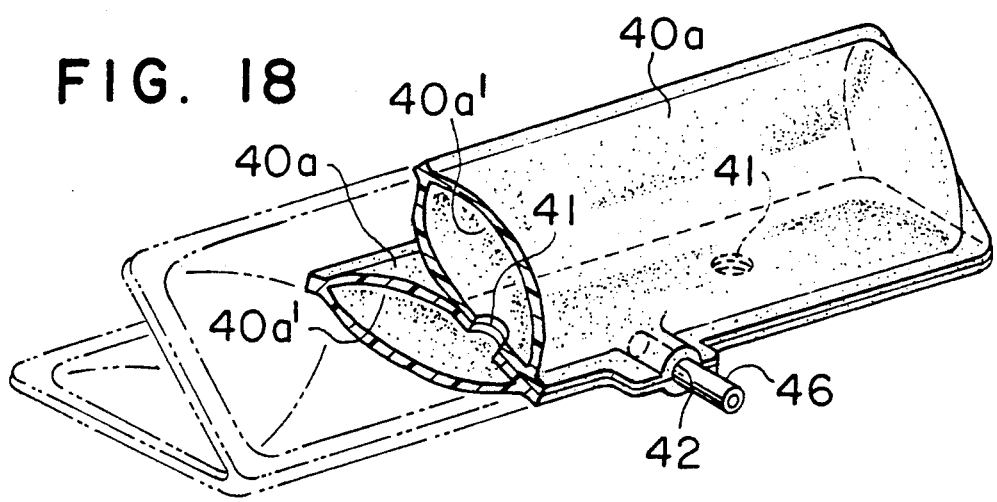
FIG. 18 is a perspective illustration.

Regarding the process for making the bag (40a), two sheets (40) having predetermined sizes are overlapped and thermally welded together along their periphery edges to form a sealed bag. A plurality of the sealed bags are stacked on top of each other and then they are further welded partially around their body portions to connect them to each other partially so as to form bellows, as shown in FIG. 16. Before the final welding process, air communication vents (41) are provided which pass through the welded body portions and also air feeding tubes (42),(46) are provided integrally with one edge of the air bag (40a). When the stacked air bags are inflated with compressed air, each portion of the air bag that is not welded expands. The expansion of the air bags forms a V-shaped valley between the air bags. According to the use of such a type of laminated sheet, the air bag has an excellent elasticity and a good tensile strength.

Figure 15:
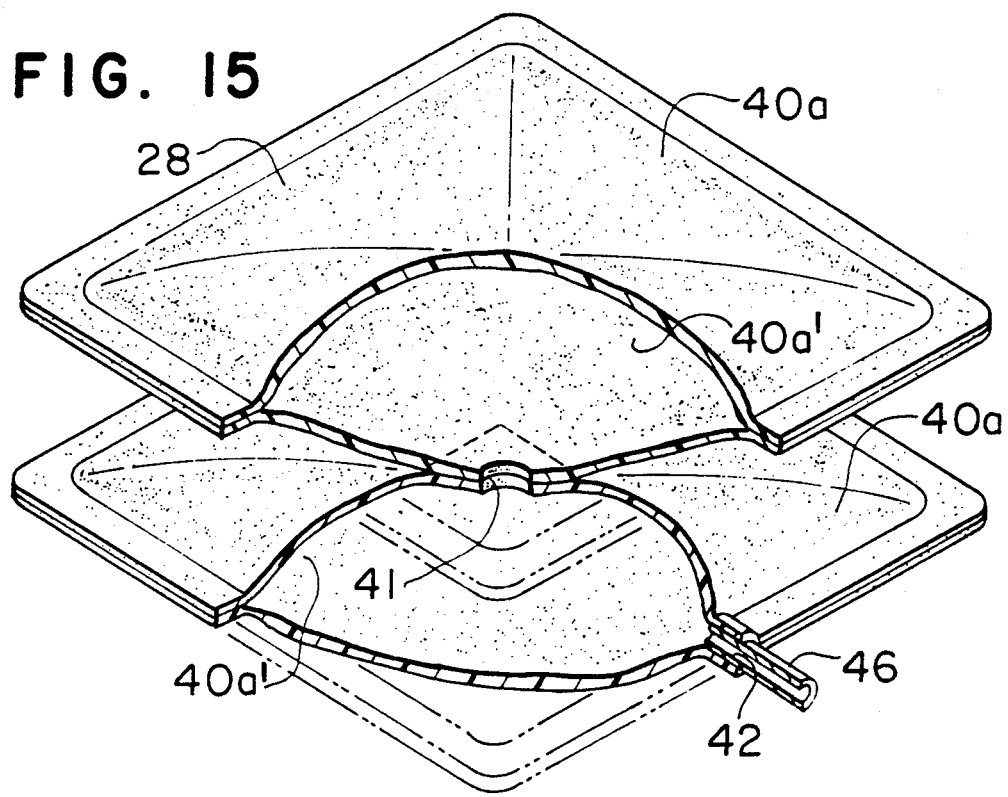
FIG. 15 is a perspective illustration.

As to the applicability of each air bag system into the present invention, the same air bag systems shown in FIG. 15 may be applied for the headrest air bags (11), the seat back controlling air bags (6) and the elevation mechanism air bags (28). Air bag systems shown in FIG. 16 may be applied for the thigh support air bags (16) and the seat mobility air bag systems (29). Further, the air bag systems shown in FIG. 17 can be applied for each of the side support air bag systems (20) (seat portion and seat back portion) and both locking device air bag systems (33),(34). The air bag systems shown in FIG. 18 can be applied for the seat gradient air bag (16) and the side support air bag (20). In modifying the above air bag systems, any process of welding the bags may be used and any number of bags can be used, depending on the allowed space.

Figure 14:
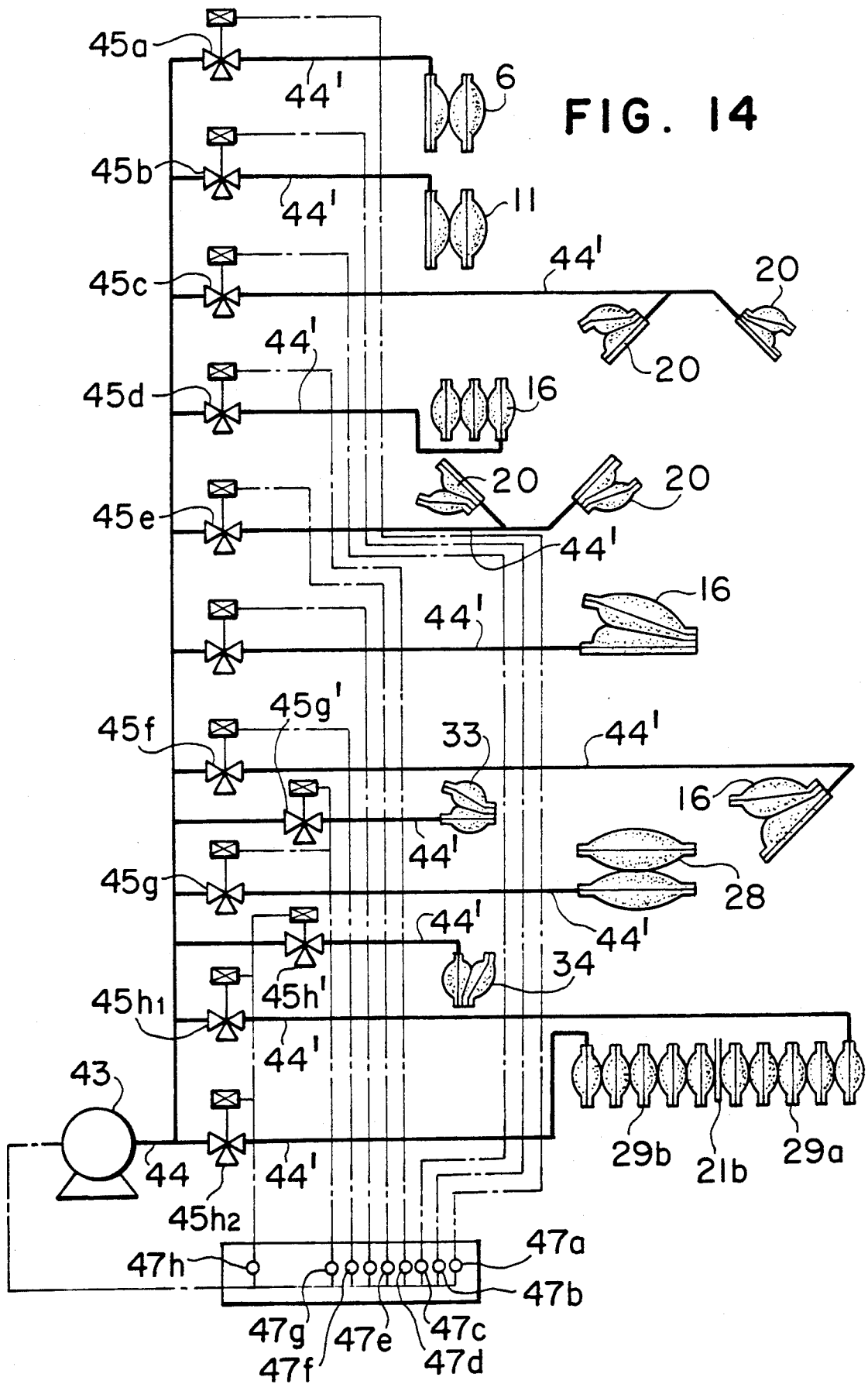
FIG. 14 is a schematic diagram of a pneumatic system and a control system.

A centralized control panel (47) can be used for the operation of each elevation mechanism. In FIG. 14, this operation system consists of the centralized control panel (47), three position type switch buttons (47a-47h) arranged on the panel surface, a low pressure-type compressor (43) with a DC motor driven by the car battery, a compressed air distributing pipe line (44) with 12 branch lines, 12 pieces of three-way-type solenoid valves (45a-45l) and 12 sets of different air bag systems (29b),(29a),(34),(28), (33), (16),(11) and (6). The valves (45a)-(45h2) are wired to the control panel (47), respectively, through switch buttons (47a) to (47h).

The switch buttons are separated into "exhaust position" (a position to exhaust air from a bag), "close position" (a position to close a valve) and "open position" (a position to open a valve). The three-way valve means that this valve has three paths such as an inlet path, an outlet and an exhaust path.

Now we shall describe the operation of the above-described mechanisms. In the elevation mechanism for the seat portion, the air bags (28) are used for elevation and disposed in the space (x) between the bottom of the seat body (a) and the bed (37). Also, the air bags (29a),(29b) are used for moving the seat body and are disposed in the space (y). A partition wall (21b) is positioned between the air bags (29a), (29b). The air bags (29a) are used for forwarding the seat body (a) toward the front direction of the seat and the air bags (29b) are used for backing the seat (a) toward the rear direction of the seat.

In the general operation of the air bag system, a switch button is turned to an "open position", then the compressor (43) sends compressed air into an air bag through the air feeding tube (42),(46) (FIG. 15). The compressed air fills the air chamber (40a') of the bags (40a) and passes through the communicating vents (41), wherein the bags (40a) are inflated.

According to the expansion of the air bags (40a), each portion of the system is moved toward the direction which the air bags (40a) is expanded.

According to the above action of the air bag system, the dogleg-shaped lever plates, such as the plate (1d) which is embedded in the lower half portion (a) of the seat back and the lever plate (b2) which is embedded in the upper half portion (1) of the seat back, are pressed toward the rear direction of the seat by the expansion of the respective air bags (6),(11) and then the upper half portion (1) and the headrest portion (b) are separately inclined toward the front direction of the seat back according to the operation instruction received from the control panel (47).

As to the seat gradient, the seat (13) is lifted by the expansion of the air bags (16). In the thigh support (15), the gradient of the thigh support pad (15) is controlled by the air bags (16), in which each of the side supports (d) provided on the sides of the seat portion (c) and the sides of the seat back (a) are moved, respectively, toward the inside direction of the seat portion (c) of the seat back (a). In this way, when each of these portions reach a preferable position, the switch buttons of the control panel (47) are turned to a "close position", which position stops the feeding of compressed air into each air bag.

In general, when a switch button is turned to an "open position", a corresponding valve opens its inlet and outlet paths to an air bag and closes its exhaust path to block the leakage of air from the valve. In contrast, when the switch button is turned to a "close position", the valve closes all the paths of inlet, outlet and exhaust.

In the above state of the path positions, if the occupant wishes to incline the upper half portion (a) of the seat back or the headrest pad (b) toward the rear direction, and also wishes to move the side-support (d) outward, as shown in FIG. 14, the user turns the switch button (47a) of the half portion (a) or (47b) of the headrest (b) to an "exhaust position". Thereafter, these valves close the inlet path and open the outlet and exhaust paths so that all air contained in those air bags is exhausted to the outside atmosphere and the bags are, respectively, contracted.

In case of operating the elevation mechanism, the switch button (47g) is turned to an "open position". In this case, first the valve (45') of the lock device (30) opens the inlet and outlet paths and closes the exhaust path so that the air bag (33) of the locking device is inflated prior to the inflation of the main air bag (28) for lifting the seat body (a) because of the interceptive existence of a delay timer arranged between the locking device valve (45g') and the main bag valve (45g). Upon the completion of disengaging the locking device, the main air bag (28) expands by opening the inlet and outlet paths and also closing the exhaust path of the valve (45g).

When the elevation reaches a preferable position, the switch button (47g) is turned to a "close position" and the main bag valve (45g) closes all the paths of the inlet, outlet and exhaust so that the air supply into the main bags (28) is stopped. The locking device valve (45g') closes the inlet path only and opens the outlet and exhaust paths to exhaust the air contained within the locking device air bag (33) for engaging the locking portion with the vertical rack (30b') and lock pin (17). By engaging the locking device, the seat body (a) is secured at the preferable position.

In the case of descending the seat body (a), when the switch button (47g) is turned to an "exhaust position", the main bag valve (45g) is instructed from the control panel (47) to open the inlet and outlet paths in a moment (about 2 seconds) to send air into the main bags (28). This sudden pressurization is to minimize the seat load, including the occupant's body weight, prior to the disengagement of the locking device to facilitate smooth disengagement without any excessive load. During the pressurization, the locking device valve (45g') is instructed to open readily the inlet and outlet paths and closes the exhaust path in order to inflate the bags (33). Upon the completion of the disengagement of the locking device, the main bag valve (45g) is further instructed to close the inlet path only and open the outlet and exhaust paths as usual so that the descent of the seat body (a) is achieved. These operation sequences of valves (45g),(45g') are originally programmed in the circuit of the control panel.

In the mobility of the seat body (a), in moving forward, when the switch button (47h) is turned to an "open position", the locking device valve (45h) is instructed to open the inlet and outlet paths and close the exhaust path to inflate the locking device bag (34) initially so that the locking device (31b)(27a) is disengaged. After that, due to a delay timer, the forwarding valve (45h$_1$) is instructed to open the inlet and outlet paths and close the exhaust path to expand the bags (29a) to move the seat body (a) forward, thereby moving the partition wall (21b). The backing valve (45h$_2$) is instructed to close only the inlet path and open the outlet path and exhaust paths to contract the air bag (29b), according to the sequence of instructions of the program.

When the seat body (a) reaches a preferable position, the switch button (47h) is turned to an "open position", the forwarding valve (45h$_1$) is instructed to close the inlet and outlet paths and open the exhaust path. The locking device valve (45h$_1$) is instructed to open the inlet and outlet paths and close the exhaust path to inflate the locking device air bag (34) which disengages the locking device (31b),(27a). Afterwards, the backing valve (45h$_2$) is instructed to open the inlet and outlet paths and close the exhaust path, thereby inflating the air bags (29b). The air bags (29a) are contracted by exhausting the air from the exhaust path of the valve (45b).

The structure of the switch button having three-way positions can be modified by another type of switch. The centralized control panel can be arranged around the dashboard of the vehicle.

In a further embodiment of the present invention, the various side supports (d) can be omitted from the invention.

The seat back portion (a) can be another type of seat back. Further, the existence of the headrest portion in the present invention is optional and not required. The thigh support (15) may also not be present in different embodiments of the present invention.

Figure 23:
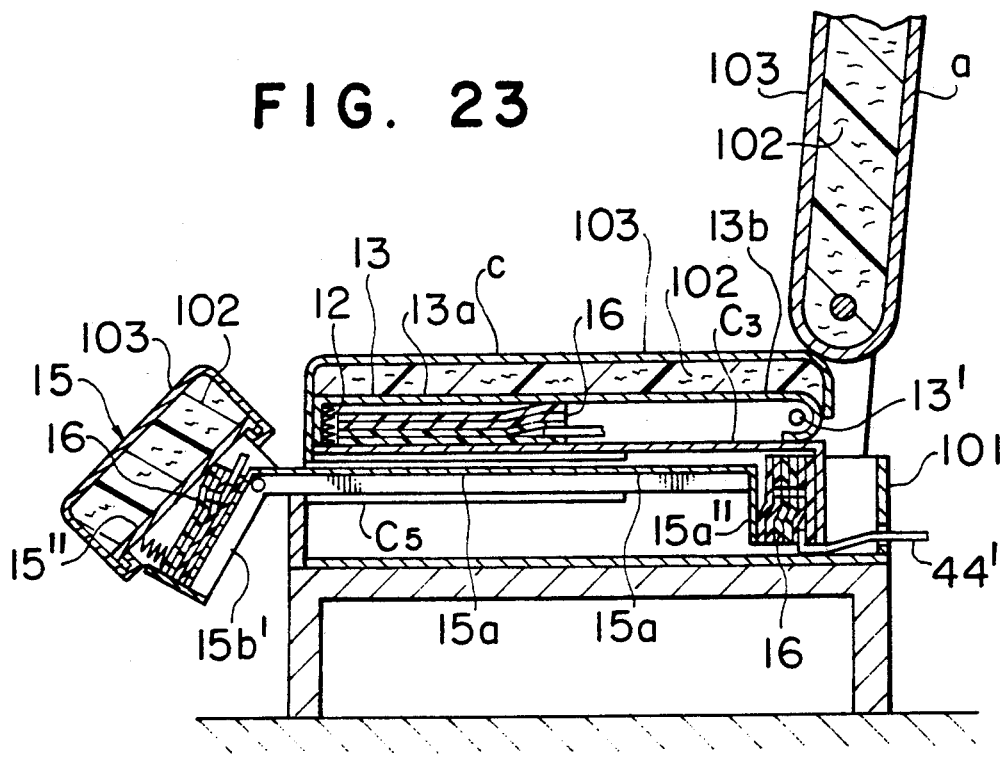
FIG. 23 is a vertical side view for showing a seat body without an elevation mechanism and a mobilizing mechanism.
Figure 24:
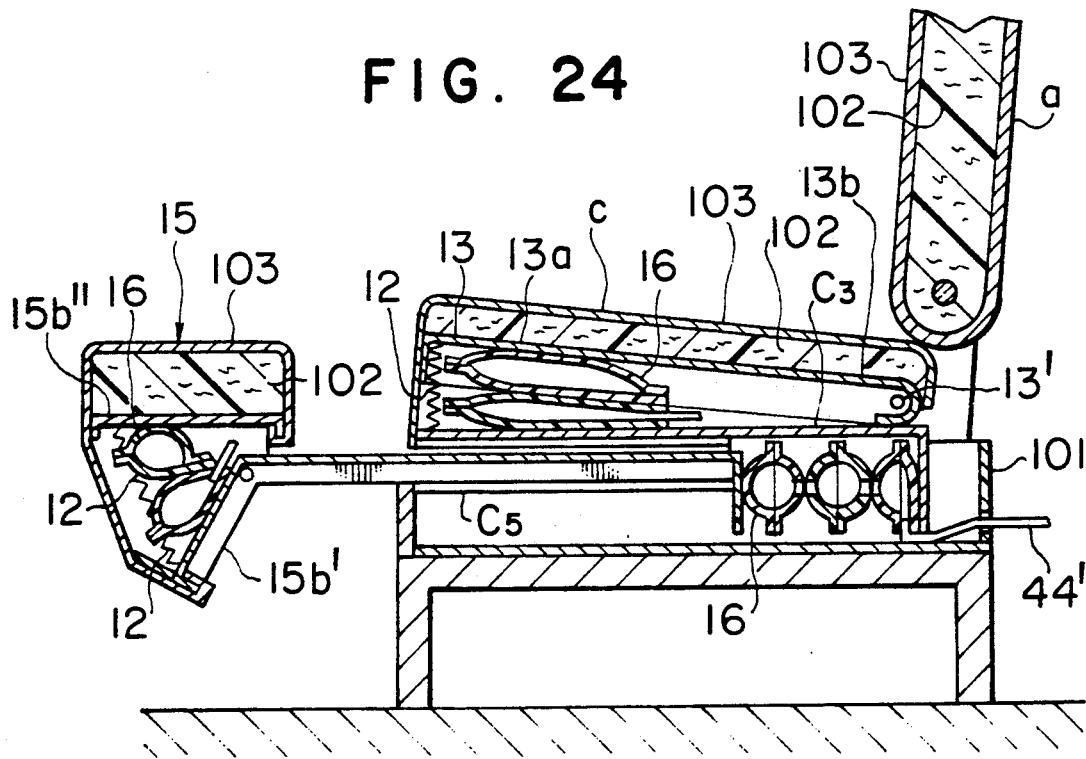
FIG. 24 is a vertical side view for showing the seat body of FIG. 23 with air bags inflated.
Figure 25:
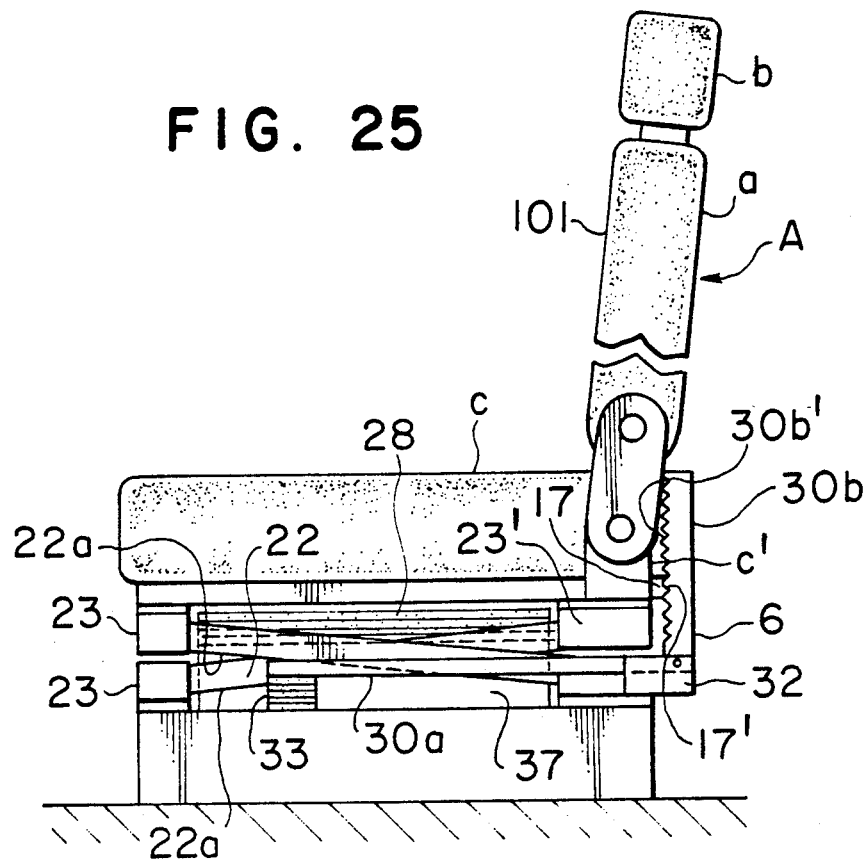
FIG. 25 is a side view for showing a seat body with an elevation mechanism.
Figure 28:
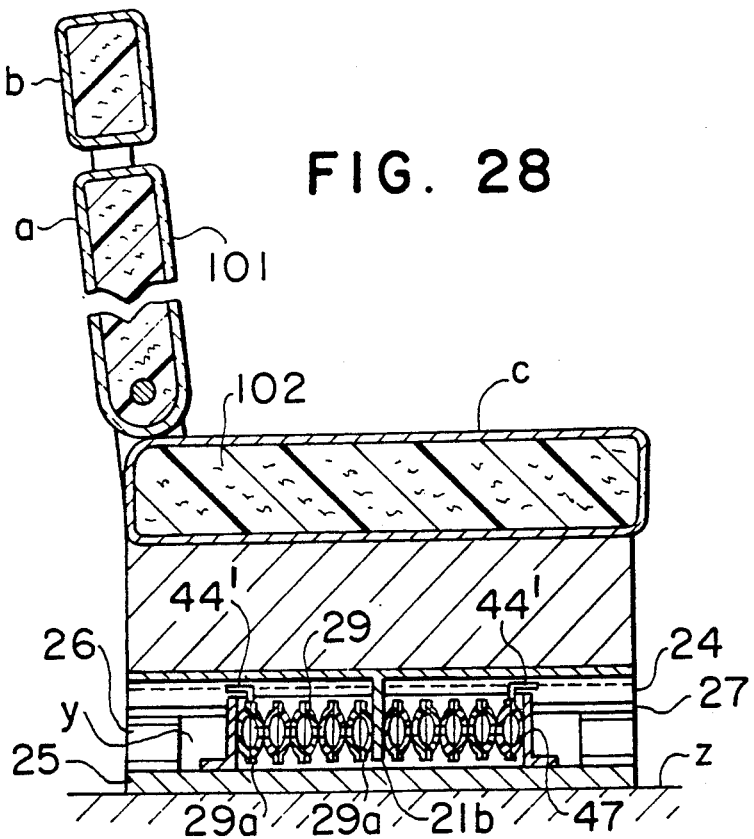
FIG. 28 is a vertical side view for showing a seat body with a mobilizing mechanism.
Figure 29:
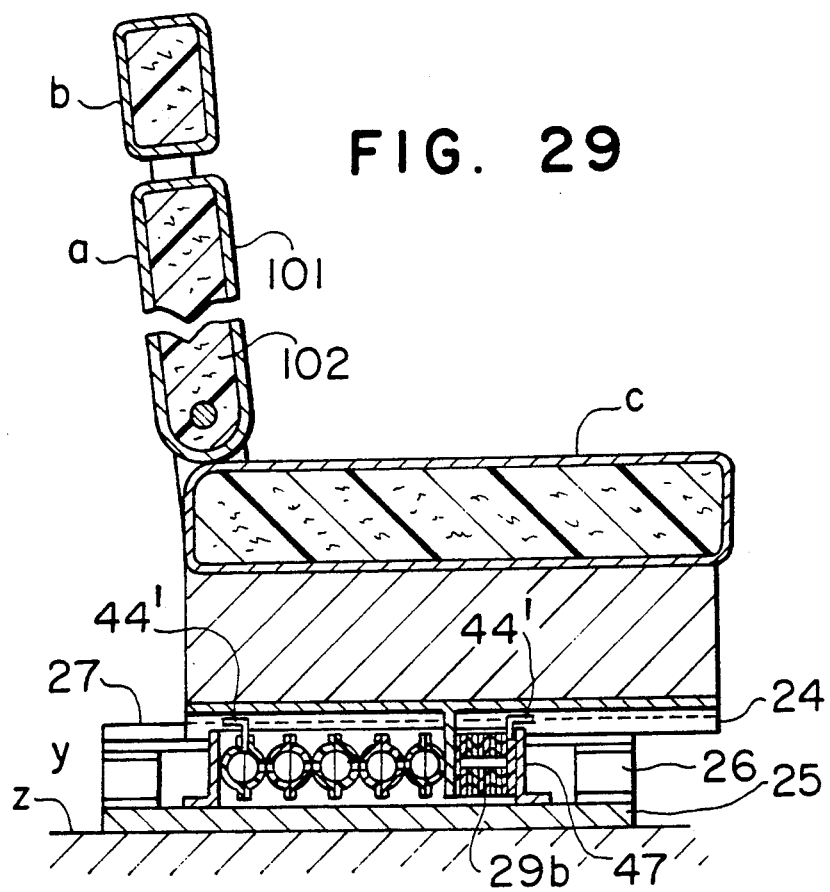
FIG. 29 is a vertical side view for showing the seat body of FIG. 28 when the seat body is mobilized.
Figure 30:
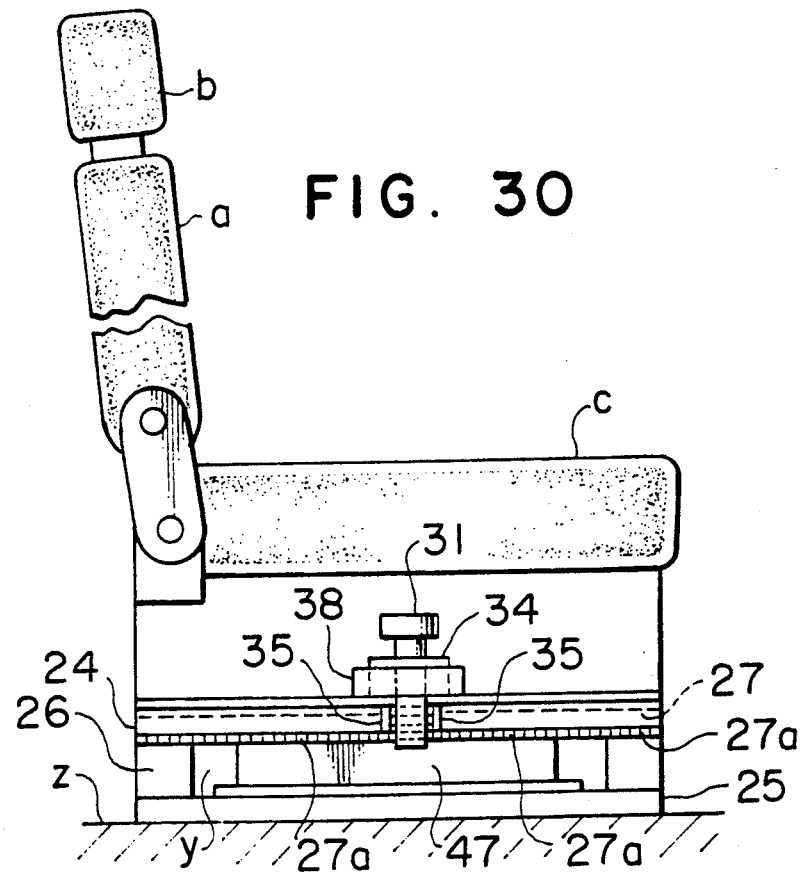
FIG. 30 is a side view for showing the seat body of FIG. 29.

The present invention can be adapted such that the type of seat portion (c) does not have the elevation mechanism and mobility mechanism as shown in FIGS. 23 and 24. Also, the type of seat portion (c) can be adapted to be formed without the elevation mechanism as shown in FIGS. 28 and 30.

As described above, this invention may be practiced or embodied in still other ways without departing from the spirit or essential character thereof. The preferred embodiments described herein are, therefore, illustrative and not restrictive, of the scope of the invention being indicated by the appended claims and all variations which come within the meaning of the claims are intended to be embraced therein.

What is claimed is:

1. An adjustable vehicle seat comprising:
    a seat back which provides a front surface against which an occupant sits, said seat back having an upper and a lower section, said upper section having a hollow portion therein, said seat back having an opening therethrough extending from said upper section into said hollow portion;
    a headrest coupled to said upper section of said seat back;

a plurality of air bags positioned within said hollow portion, said air bags being connected together so as to form a stack, said air bags including at least one air communicating opening so as to provide communication between adjacent ones of said air bags;

a dogleg-shaped lever having a straight portion and a bend, one of said bend being connected to said headrest and another end of said bend portion being pivotally mounted to said upper section of said seat back, said straight portion extending into said hollow portion and being positioned adjacent said air bags; and means for inflating said air bas so as to move said straight portion of said lever in a direction away from said front surface of said seat back, whereby said headrest is moved in a direction toward said front surface of said seat back for adjusting the position of said headrest.

2. An adjustable vehicle seat according to claim 1 further comprising means for deflating said air bags so as to move said straight portion of said lever in a direction toward said front surface, whereby said headrest is moved in a direction away from said front surface of said seat back.

3. An adjustable vehicle seat comprising:
a seat back which provides a front surface against which an occupant sits, said seat back having an upper and a lower section, said lower section having a hollow portion therein;

a plurality of air bags positioned within said hollow portion, said air bags being connected together so as to form a stack, said air bags including at least one air communicating opening so as to provide communication between adjacent ones of said air bags;

a dogleg-shaped lever having a straight portion and a bend, one end of said bend being connected to said upper section of said seat back and another end of said bend being pivotally mounted to said upper section of said seat back, said straight portion extending into said hollow portion and being positioned adjacent said air bags; and means for inflating said air bags so as to move said straight portion of said lever in a direction away from the front surface of said seat back, whereby said upper portion of said seat back is moved in a direction toward said front surface of said seat back for adjusting the position of said upper portion of said seat back.

4. An adjustable seat according to claim 3 wherein said upper section has a second hollow portion therein, said seat back having an opening therethrough extending through said upper section into said second hollow portion;

a headrest coupled to said upper section of said seat back;

a plurality of second air bags positioned within said second hollow portion, said second air bags being connected together so as to form a stack, said second air bas including at least one air communicating opening so as to provide communication between adjacent ones of said second air bags;

a second dogleg-shaped lever having a straight and a bend, one end of said bend portion of said second lever being connected to said headrest and another end of said bend of said second lever being pivotally mounted to said upper section of said seat back, said straight portion of said second lever extending into said second hollow portion and being positioned adjacent said second air bags; and means for inflating said second air gabs so as to move said straight portion of said second lever in a direction away from the front surface of said seat back, whereby said headrest is moved in a direction toward the front surface of said seat back for adjusting the position of said headrest.

5. An adjustable vehicle seat according to claim 3 further comprising means for deflating said air bags so as to move said straight portion of said lever in a direction toward said front surface, whereby said headrest is moved in a direction away from the front surface of said seat back.

6. An adjustable vehicle seat assembly comprising:
a seat cushion having a top and bottom surface, said top surface on which an occupant sits;

a seat including a front and a rear wall;

a dogleg shaped plate having a straight portion and a bend, said straight portion positioned below said bottom surface of said seat cushion, said straight portion being slidably movable in a direction parallel to said bottom surface, said bend provided to have one end bent downwardly and another end positioned toward said occupant;

a plurality of first air bags positioned on an upper surface of said bend, said first air bags being connected together so as to form a stack, said first air bags including at least one air communicating opening so as to provide communication between adjacent ones of said first air bags;

a support pad pivotally attached to the end of said bend which is positioned toward said occupant, said support pad having a top and a bottom surface, said top surface of said support pad supporting a portion of said occupant's legs, said bottom surface positioned adjacent said plurality of air bags;

means for inflating said first air bags so as to move said support pad in an upward direction for adjusting the position of said support pad;

a vertical plate attached at a right angle to said straight portion of said dogleg shaped plate;

a plurality of second air bags positioned between said vertical plate and the rear wall of said seat portion, said second air bags being connected together so as to form a stack, said second air bags including at least one air communicating opening so as to provide communication between adjacent ones of said second air bags; and means for inflating said second air bags so as to slidably move said straight portion in a direction away from the front wall of said seat back, whereby said support pad is moved in a direction away from said front wall of said seat back.

7. An adjustable vehicle seat assembly according to claim 6 further comprising means for deflating said first air bags so as to move said support pad in a downward direction and means for deflating said second air bags so as to move said support pad in a direction toward said front wall of said seat back.

8. An adjustable vehicle seat comprising:
a base;

a vehicle seat cushion having an upper surface upon which an occupant sits and a lower surface;

a pair of bar members for supporting said seat cushion, each of said bar members having a top and bottom end, the top end of one of said bar members being slidably mounted to one end of said lower surface of said seat and the top end of the other of said bar members being slidably mounted to another end of the lower surface of said seat, said bar members being pivotally mounted to one another at a central portion thereof, said bottom end of one of said bar members being mounted to one end of said base and said bottom end of said other of said bar members being mounted to another end of said base;

a plurality of air bags positioned upon said base below said lower surface of said seat and between said bar members, said air bags being connected together so as to form a stack, said air bags including at least one air communicating opening so as to provide communication between adjacent ones of said air bags; and means for inflating said air bags so as to upwardly move said lower surface of said seat cushion in a direction away from said base, whereby said upper surface of said seat portion is raised.

9. A vehicle seat according to claim 8 further comprising:

a lock pin extending from said lower surface;

a L-shaped frame including a horizontal portion and a vertical portion, said L-shaped frame pivotally mounted to said base at the intersection of said horizontal and vertical portion, said vertical portion provided with a plurality of rack gears adapted to engage with said lock pin;

a plurality of second air gabs positioned between said base and the end of said horizontal plate which is opposite to the intersection of said horizontal and vertical portion said second air bags being connected together so as to form a stack, said second air gabs including at least one air communicating opening so as to provide communication between adjacent ones of said air bags; and means for inflating said second air bags so as to upwardly move said horizontal plate, whereby said lock pin is engaged with a different one of said plurality of rack gears for locking said seat.

10. A vehicle seat assembly comprising;

a vehicle seat body having an upper and lower surface, said body having a front and a rear wall;

a pair of rails having a convex shape provided on the floor of the vehicle, said pair of rails being positioned parallel to said seat body;

a pair of frames having a concave shape attached to said lower surface of said seat body, said pair of frames slidably engaging with said pair of rails;

a vertical partition wall extending vertically from said lower surface of said seat body at a predetermined position along said lower surface;

a rear frame extending vertically from a base and positioned below said seat body;

a front frame extending vertically from said base and positioned below said seat body;

a plurality of first air bags positioned between said vertical wall and said rear frame, said first air bags being connected together so as to form a stack, said first air bags including at least one air communicating opening so as to provide communication between adjacent ones of said first air bags;

a plurality of second air bags positioned between said vertical wall and said front frame, said second air bags being connected together so as to form a stack, said second air bags including at least one air communicating opening so as to provide communication between adjacent ones of said second air bags; and means for inflating said first and second air bags, whereby said seat body slidably moves in one direction when said first air bags are inflated and said seat body moves in the opposite direction when said second air bags are inflated.

11. A vehicle seat assembly according to claim 10 further comprising:

rack gears positioned on the outer surface of one of said pair of convex rails;

a L-shaped plate pivotally mounted at a right angle to said convex shaped rails, said L-shaped plate having a vertical and a horizontal portion, said horizontal portion having a lock pin adapted to engage with one of said plurality of rack gears;

a backplate extending from said base in a direction parallel to said L-shaped plate;

a plurality of third air bags positioned between said backplate and the vertical portion of said L-shaped plate said second air bags being connected together so as to form a stack, said second air gabs including at least one air communicating opening so as to provide communication between adjacent ones of said air bags; and means for inflating said third air bags so as to move said vertical portion of said L-shaped plate, whereby said lock pin is engaged with a different one of said plurality of rack gears for locking said seat.

12. An adjustable vehicle seat comprising:

a seat cushion having a top and bottom surface, said top surface on which said occupant sits; said seat cushion having a pair of hollow portions therein positioned at either end of said seat cushion;

a pair of support pads, one of said pair of support pads positioned on one side of said seat cushion and the other one of said pair of support pads positioned on the other side of said seat cushion; said pair of support pads extending upwardly from said seat cushion;

a plurality of air bags positioned within each one of said pair of hollow portions, said air bags being connected together so as to form a stack, said air bags including at least one air communicating opening so as to provide communication between adjacent ones of said air bags;

a pair of dogleg-shaped levers having a straight portion and a bend, one of said pair of levers having one end of said bend being connected to said one of said pair of support pads and the other of said pair of levers having one end of said bend being connected to said other one of said pair of support pads, said straight portion of each of said levers extending into a respective one of said hollow portions and being positioned adjacent a respective one of said plurality of air bags; and means for inflating said air bags so as to move said straight portion of said lever in a direction away from said front surface of said seat back for adjusting the position of said support pads.

13. An adjustable vehicle seat comprising:

a seat back which provides a front surface against which an occupant sits, said seat back having an upper and a lower section, said lower section having a hollow portion therein, a plurality of first air bags positioned within said hollow portion, said first air bags being connected together so as to form a stack, said first air bags including at least one air communicating opening so as to provide communication between adjacent ones of said air bags, a first dogleg-shaped lever having a straight portion and a bend, one end of said bend being connected to said upper section of said seat back and another end of said bend being pivotally mounted to said supper section of said seat back, said straight portion extending into said hollow portion and being positioned adjacent said air bags, and means for inflating said first air bags so as to move said straight portion of said lever in a direction away from the front surface of said seat back, whereby said upper section of said seat back is moved in a direction toward the front surface of said seat back for adjusting the position of said upper section of said seat back;

said upper section having a second hollow portion therein, said seat back having an opening therethrough extending through said upper section into said second hollow portion, a headrest coupled to said upper section of said seat back, a plurality of second air bags positioned within said second hollow portion, said second air gabs being connected together so as to form a stack, said second air bags including at least one air communicating opening so as to provide communication between adjacent ones of said second air bags, a second dogleg-shaped lever having a straight portion and a bend, one end of said bend of said second lever being connected to said headrest and another end of said ben of said second lever being pivotally mounted to said upper section of said seat back, said straight portion of said second lever extending into said second hollow portion and being positioned adjacent said second air bags, and means for inflating said second air bags so as to move said straight portion of said second lever in a direction away from the front surface of said seat back, whereby said headrest is moved in a direction toward the front surface of said seat back for adjusting the position of said headrest;

a seat cushion having a top and bottom surface, said top surface on which an occupant sits, a seat including a front and a rear wall, a third dogleg shaped plate having a straight portion and a bend, said straight portion of said third dogleg shaped plate positioned below said bottom surface of said seat cushion, said straight portion being slidably movable in a direction parallel to said bottom surface, said bend provided to have one end bent downwardly and another end positioned toward said occupant, a plurality of third air bags positioned on an upper surface of said bend, said third air bags being connected together so as to form a stack, said third air bags including at least one air communicating opening so as to provide communication between adjacent ones of said third air bags, a support pad pivotally attached to the end of said bend portion of said third plate which is positioned toward said occupant, said support pad having a top and a bottom surface, said top surface of said support pad supporting a portion of said occupant's legs, said bottom surface positioned adjacent said plurality of third air bags, means for inflating said air bags so as to move said support pad in an upward direction for adjusting the position of said support pad, a vertical plate attached at a right angle to said straight portion of said third plate, a plurality of fourth air bags positioned between said vertical plate and a rear wall of said seat portion, said fourth air bags being connected together so as to form a stack, said fourth air bas including at least one air communicating opening so as to provide communication between adjacent ones of said fourth air bags, and mean for inflating said fourth air bags so as to slidably move said straight portion of said third plate in a direction away from a front wall of said seat back, whereby said support pad is moved in a direction away from said front wall of said seat back; and a vehicle seat body having an upper and lower surface, said body having a front and rear wall, a pair of rails having a convex shape provided on a floor of the vehicle, said pair of rails being positioned parallel to said seat body, a pair of frames having a concave shape attached to said lower surface of said seat body, said pair of frames slidably engaging with said pair of rails, a vertical partition wall extending vertically from said lower surface of said seat body at a predetermined position along said lower surface of said seat body, a rear frame extending vertically from said base and positioned below said seat body, a front frame extending vertically from said base and positioned below said seat body, a plurality of fifth air bags positioned between said vertical wall and said rear frame, said fifth air bags being connected together so as to form a stack, said fifth air bags including at least one air communicating opening so as to provide communication between adjacent ones of said fifth air bags, a plurality of sixth air bags positioned between said vertical wall and said front frame, said sixth air bags being connected together so as to form a stack, said sixth air bags including at least one air communicating opening so as to provide communication between adjacent ones of said sixth air bags, and means for inflating said fifth and sixth air bags, whereby said seat body slidably moves in one direction when said fifth air bags are inflated and said seat body moves in an opposite direction when said sixth air bags are inflated.

* * * * *